US012608965B2

(12) United States Patent
Han et al.

(10) Patent No.: US 12,608,965 B2
(45) Date of Patent: Apr. 21, 2026

(54) ELECTRONIC DEVICE FOR GENERATING CLOTHING MANAGEMENT INFORMATION AND METHOD OF CONTROLLING THE SAME

(71) Applicant: SAMSUNG ELECTRONICS CO., LTD., Suwon-si (KR)

(72) Inventors: Seongjoo Han, Suwon-si (KR); Myeongjin Lee, Suwon-si (KR); Harsh Agarwal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 18/403,023

(22) Filed: Jan. 3, 2024

(65) Prior Publication Data

US 2024/0273929 A1 Aug. 15, 2024

Related U.S. Application Data

(63) Continuation of application No. PCT/KR2023/018719, filed on Nov. 21, 2023.

(30) Foreign Application Priority Data

Feb. 9, 2023 (KR) ........................ 10-2023-0017295
May 22, 2023 (KR) ........................ 10-2023-0065787

(51) Int. Cl.
*G06V 20/70* (2022.01)
*D06F 34/32* (2020.01)
(Continued)

(52) U.S. Cl.
CPC .............. *G06V 20/70* (2022.01); *D06F 34/32* (2020.02); *G06V 10/761* (2022.01); *G06V 10/82* (2022.01)

(58) Field of Classification Search
CPC .... D06F 93/00; G06V 10/764; G06V 10/761; G06F 16/58; G06F 16/35; G06F 16/55; H04N 23/57
See application file for complete search history.

(56) References Cited

U.S. PATENT DOCUMENTS 10,977,819 B2 4/2021 Kim et al.
11,692,293 B2 * 7/2023 Kim ......................... G06N 3/08
68/12.02

(Continued)

FOREIGN PATENT DOCUMENTS

CN 107988757 A * 5/2018 ............. D06F 34/18
CN 107794698 B * 5/2020 ............. D06F 33/36
(Continued)

OTHER PUBLICATIONS

Y. Liu, S. Xie, H. He and J. Zhu, "A Design for an Intelligent Washing Machine Control System," 2024 IEEE 2nd International Conference on Image Processing and Computer Applications (ICIPCA), Shenyang, China, 2024, pp. 185-189, doi: 10.1109/ICIPCA61593.2024.10709225. (Year: 2024).*

(Continued)

*Primary Examiner* — Michael Robert Cammarata
(74) *Attorney, Agent, or Firm* — Sughrue Mion, PLLC

(57) ABSTRACT

Disclosed are an electronic device and a method of controlling the same. An electronic device according to an embodiment of the disclosure includes a camera, a memory configured to store at least one instruction, a display, and at least one processor configured to execute the at least one instruction to acquire a label image of clothing through the camera, generate management information on the clothing using the acquired label image, and control the display to display the generated management information. The at least one processor identifies a plurality of clothing management symbols included in the label image, identifies a misrecognized (Continued)

symbol among the plurality of identified clothing management symbols based on a standard type and a management type of each of the plurality of identified clothing management symbols, and corrects the identified misrecognized symbol based on at least one of a standard type and a management type of another normally recognized symbol.

20 Claims, 14 Drawing Sheets

(51) Int. Cl.
    *G06V 10/74*       (2022.01)
    *G06V 10/82*       (2022.01)

(56)           References Cited

U.S. PATENT DOCUMENTS

| | | | |
|---|---|---|---|
| 2011/0063468 A1* | 3/2011 | Ahn | G06V 20/63 |
| | | | 348/222.1 |
| 2013/0239337 A1* | 9/2013 | Kim | D06F 33/36 |
| | | | 68/12.02 |
| 2018/0165486 A1* | 6/2018 | Bajovic | D06F 33/32 |
| 2019/0139256 A1 | 5/2019 | Kim et al. | |
| 2024/0071115 A1* | 2/2024 | Kim | G06V 30/16 |
| 2024/0112477 A1* | 4/2024 | Kim | G06V 20/62 |
| 2024/0273929 A1* | 8/2024 | Han | D06F 34/05 |

FOREIGN PATENT DOCUMENTS

| | | | | | |
|---|---|---|---|---|---|
| CN | 112195630 | A | | 1/2021 | |
| CN | 112580726 | A | | 3/2021 | |
| CN | 108866934 | B | | 4/2021 | |
| CN | 112580726 | B | * | 6/2024 | ............ G06F 18/22 |
| EP | 3 396 051 | B1 | | 4/2018 | |
| KR | 10-2018-0049718 | A | | 5/2018 | |
| KR | 10-2019-0051230 | A | | 5/2019 | |
| KR | 10-2019-0094297 | A | | 8/2019 | |
| KR | 10-2053940 | B1 | | 12/2019 | |
| KR | 10-2070783 | B1 | | 1/2020 | |
| KR | 10-2259477 | B1 | | 6/2021 | |
| KR | 10-2023-0020805 | A | | 2/2023 | |
| WO | WO-2024167109 | A1 | * | 8/2024 | ............ H04N 23/57 |

OTHER PUBLICATIONS

International Search Report dated Feb. 26, 2024, issued by the International Searching Authority in International Application No. PCT/KR2023/018719.

Written Opinion dated Feb. 26, 2024, issued by the International Searching Authority in International Application No. PCT/KR2023/018719.

Communication dated Nov. 17, 2025, issued by the European Patent Office in counterpart European Application No. 23921482.8.

Hullermeier et al., "Rule-Based Multi-label Classification: Challenges and Opportunities," Springer, LNCS 12173, pp. 3-19, 2020, XP04758506.

Bogatinovski et al., "Comprehensive comparative study of multi-label classification methods," Expert Systems With Applications, vol. 203, No. 117215, 2020, Total 18 pages, XP93312720.

* cited by examiner

START

ACQUIRE LABEL IMAGE OF CLOTHING THROUGH CAMERA    ~S310

GENERATE MANAGEMENT INFORMATION ON CLOTHING USING ACQUIRED LABEL IMAGE    ~S320

CONTROL DISPLAY TO DISPLAY GENERATED MANAGEMENT INFORMATION    ~S330

END

FIG. 4

| CLOTHING MANAGEMENT SYMBOL | ID | MANAGEMENT SYMBOL | STANDARD TYPE | SEMANTIC INFORMATION |
|---|---|---|---|---|
| 511' [40℃] | 1001 | WASHING | KS | WASH IN WATER AT 40℃ |
| 512' [60℃] | 1002 | WASHING | KS | WASH IN WATER AT 60℃ |
| 513' | 1003 | WASHING | KS | HAND-WASH IN WATER AT 30℃ |
| 514' | 1004 | WASHING | ASTM | WASH IN WATER AT 40℃ |
| ⋮ | ⋮ | ⋮ | ⋮ | ⋮ |
| 515' | 2001 | DRYING | KS | DRY IN SUNLIGHT AND HANG AND DRY ON HANGER |
| 516' | 2002 | DRYING | KS | ENABLE MACHINE DRYING AFTER WASHING |
| ⋮ | ⋮ | ⋮ | ⋮ | ⋮ |

FIG. 7

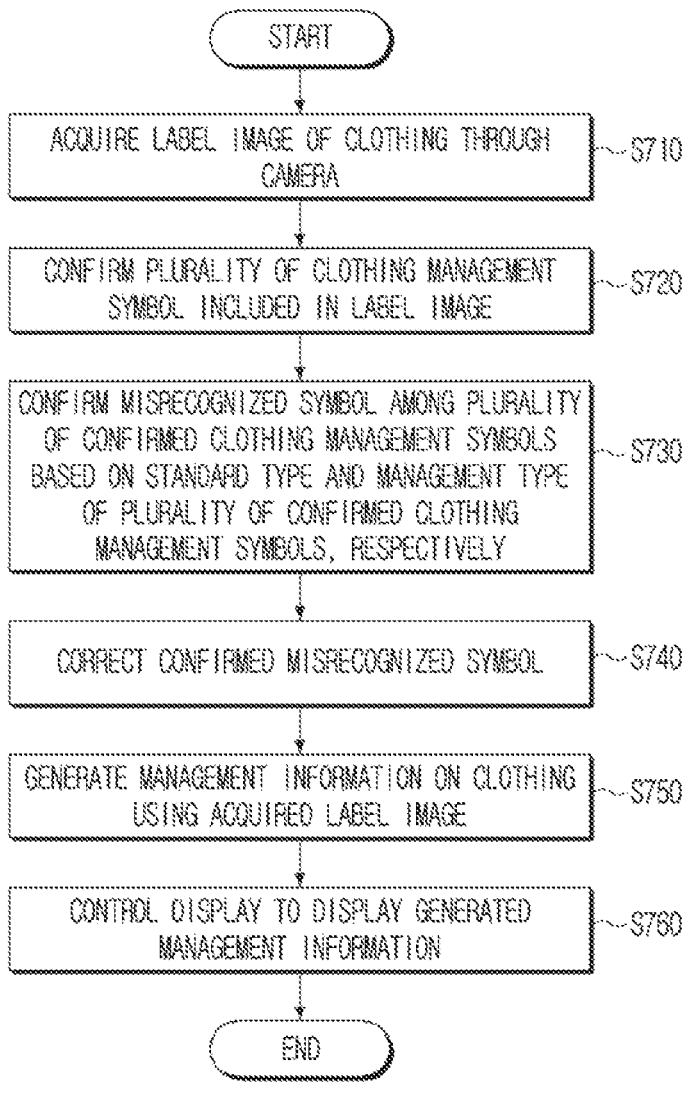

START

ACQUIRE LABEL IMAGE OF CLOTHING THROUGH CAMERA ~S710

CONFIRM PLURALITY OF CLOTHING MANAGEMENT SYMBOL INCLUDED IN LABEL IMAGE ~S720

CONFIRM MISRECOGNIZED SYMBOL AMONG PLURALITY OF CONFIRMED CLOTHING MANAGEMENT SYMBOLS BASED ON STANDARD TYPE AND MANAGEMENT TYPE OF PLURALITY OF CONFIRMED CLOTHING MANAGEMENT SYMBOLS, RESPECTIVELY ~S730

CORRECT CONFIRMED MISRECOGNIZED SYMBOL ~S740

GENERATE MANAGEMENT INFORMATION ON CLOTHING USING ACQUIRED LABEL IMAGE ~S750

CONTROL DISPLAY TO DISPLAY GENERATED MANAGEMENT INFORMATION ~S760

END

1

ELECTRONIC DEVICE FOR GENERATING CLOTHING MANAGEMENT INFORMATION AND METHOD OF CONTROLLING THE SAME

CROSS-REFERENCE TO RELATED APPLICATIONS

This application is a by-pass continuation of International Application No. PCT/KR2023/018719, filed on Nov. 21, 2023, which is based on and claims priority to Korean Patent Application No. 10-2023-0017295, filed on Feb. 9, 2023, in the Korean Intellectual Property Office, and Korean Patent Application No. 10-2023-0065787, filed on May 22, 2023, in the Korean Intellectual Property Office, the disclosures of which are incorporated by reference herein in their entireties.

BACKGROUND

1. Field

The disclosure relates to an electronic device for generating clothing management information and a method of controlling the same. More specifically, the disclosure relates to an electronic device for generating clothing management information based on a clothing label image and a method of controlling the same.

2. Description of Related Art

With the development of electronic technology, various electronic devices (e.g., washing machines, dryers, etc.) provide a function of more elaborately managing (e.g., washing, drying, sterilization, etc.) a user's clothing. However, in order to still manage the user's clothing, a user should determine characteristics (e.g., ingredient, mixing ratio, material, color, etc.) of clothing or a method of managing clothing, and input control commands separately from each electronic device to perform functions appropriate for the characteristics of clothing or the method of managing clothing. In particular, the user determines the characteristics of clothing or the method of managing clothing based on clothing information written on a label attached to one side of the clothing. Therefore, when the clothing information written on the clothing label is misunderstood or the clothing label is lost (or missed), the characteristics of clothing and the method of managing clothing may not be accurately determined.

SUMMARY

According to an aspect of the disclosure, an electronic device includes: a camera; at least one memory configured to store at least one instruction; a display; and at least one processor configured to execute the at least one instruction to: acquire a label image of clothing through the camera, based on identifying a plurality of clothing management symbols in the label image: identify a misrecognized clothing management symbol among the plurality of clothing management symbols based on a standard type and a management type of each of the plurality of clothing management symbols, correct the misrecognized clothing management symbol based on at least one of a standard type and a management type of a normally recognized symbol from among the plurality of clothing management symbols, generate management information related to the clothing using the label image, and control the display to display the generated management information.

The at least one memory may store a neural network model configured to recognize the plurality of clothing management symbols in the label image, and the at least one processor may be further configured to execute the at least one instruction to identify the plurality of clothing management symbols included in the label image using the neural network model.

The at least one processor may be further configured to execute the at least one instruction to: identify candidate symbol information for each of the plurality of clothing management symbols and reliability for the identified candidate symbol information, and identify the misrecognized clothing management symbol by comparing a standard type of the identified candidate symbol information having a highest reliability value with a standard type of another identified candidate symbol information.

The at least one processor may be further configured to execute the at least one instruction to: identify candidate symbol information for each of the plurality of clothing management symbols and reliability for the identified candidate symbol information, identifies, among the plurality of clothing management symbols, a plurality of first clothing management symbols corresponding to identified candidate symbol information with the same management type, and identify as the misrecognized clothing management symbol, a first clothing management symbol corresponding to the identified candidate symbol information having a lowest reliability among the plurality of first clothing management symbols.

The at least one processor may be further configured to execute the at least one instruction to: identify a plurality of pieces of semantic information corresponding to each of the plurality of first clothing management symbols, and based on identifying that the plurality of pieces of semantic information do not match, identify, as the misrecognized clothing management symbol, the first clothing management symbol corresponding to the identified candidate symbol information having the lowest reliability among the plurality of first clothing management symbols.

The at least one processor may be further configured to execute the at least one instruction to: based on the plurality of clothing management symbols being arranged in a plurality of rows in the label image, repeat the operations of claim 1 on a row-by-row basis.

The at least one processor may be further configured to execute the at least one instruction to: based on identifying that the label image does not include clothing management symbols, identify a material of the clothing based on the label image, and generate the management information on the clothing based on the identified material.

The at least one memory may store a plurality of candidate symbol images corresponding to each of a plurality of candidate symbol information, and the at least one processor may be further configured to execute the at least one instruction to: identify candidate symbol information for each of the plurality of clothing management symbols and reliability for the identified candidate symbol information, based on the identified candidate symbol information having a highest reliability value having a clothing management symbol of a first type, identify the identified clothing management symbol corresponding to the identified candidate symbol information having the highest reliability value as an unrecognized symbol, acquire a clothing management symbol image corresponding to the unrecognized symbol based on the label image, and identify a standard type and a management type of the unrecognized symbol based on a similarity between the acquired clothing management symbol image and each of the plurality of candidate symbol images.

The at least one processor may be further configured to execute the at least one instruction to: based on identifying that the label image does not include a clothing management symbol associated with a first management type, acquire at least one first management processor information comprising management information corresponding to the first management type based on the generated management information, and generate management information corresponding to the first management type based on the acquired first management process information.

The electronic device may further include: a communication interface configured to communicate with a clothing processing device, wherein the at least one processor is further configured to execute the at least one instruction to: control the communication interface to transmit management information corresponding to a management type to the clothing processing device.

According to an aspect of the disclosure, a method of controlling an electronic device includes: acquiring a label image of clothing through a camera; identifying a plurality of clothing management symbols in the label image; identifying a misrecognized clothing management symbol among the plurality of clothing management symbols based on a standard type and a management type of each of the plurality of clothing management symbols; correcting the misrecognized clothing management symbol based on at least one of a standard type and a management type of a normally recognized symbol from among the plurality of clothing management symbols; generating management information on the clothing using the label image; and displaying the generated management information on a display.

The identifying the plurality of clothing management symbols may include using a neural network model configured to recognize the plurality of clothing management symbols in the label image.

The identifying the misrecognized clothing management symbol may further include: identifying candidate symbol information for each of the plurality of clothing management symbols and reliability for the identified candidate symbol information; and identifying the misrecognized clothing management symbol by comparing a standard type of the identified candidate symbol information having a highest reliability value with a standard type of another identified candidate symbol information.

The identifying the misrecognized clothing management symbol may further include: identifying candidate symbol information for each of the plurality of clothing management symbols and reliability for the identified candidate symbol information; identifying, among the plurality of clothing management symbols, a plurality of first clothing management symbols corresponding to identified candidate symbol information with the same management type; and identifying, as the misrecognized clothing management symbol, a first clothing management symbol corresponding to the identified candidate symbol information having a lowest reliability among the plurality of first clothing management symbols.

The identifying the misrecognized clothing management symbol may further include: identifying a plurality of pieces of semantic information corresponding to each of the plurality of first clothing management symbols; and based on identifying that the plurality of pieces of identified semantic information do not match, identifying, as the misrecognized clothing management symbol, the first clothing management symbol corresponding to the identified candidate symbol information having the lowest reliability among the plurality of first clothing management symbols.

According to an aspect of the disclosure, a non-transitory computer readable medium includes instructions stored therein, which when executed by at least one processor cause the at least one processor to execute a method of controlling an electronic device, the method including: acquiring a label image of clothing through a camera; identifying a plurality of clothing management symbols in the label image; identifying a misrecognized clothing management symbol among the plurality of clothing management symbols based on a standard type and a management type of each of the plurality of clothing management symbols; correcting the misrecognized clothing management symbol based on at least one of a standard type and a management type of a normally recognized symbol from among the plurality of clothing management symbols; generating management information on the clothing using the label image; and displaying the generated management information on a display.

The identifying the plurality of clothing management symbols may include using a neural network model configured to recognize the plurality of clothing management symbols in the label image.

The identifying the misrecognized clothing management symbol may further include: identifying candidate symbol information for each of the plurality of clothing management symbols and reliability for the identified candidate symbol information; and identifying the misrecognized clothing management symbol by comparing a standard type of the identified candidate symbol information having a highest reliability value with a standard type of another identified candidate symbol information.

The identifying the misrecognized clothing management symbol may further include: identifying candidate symbol information for each of the plurality of clothing management symbols and reliability for the identified candidate symbol information; identifying, among the plurality of clothing management symbols, a plurality of first clothing management symbols corresponding to identified candidate symbol information with the same management type; and identifying, as the misrecognized clothing management symbol, a first clothing management symbol corresponding to the identified candidate symbol information having a lowest reliability among the plurality of first clothing management symbols.

The identifying the misrecognized clothing management symbol may further include: identifying a plurality of pieces of semantic information corresponding to each of the plurality of first clothing management symbols; and based on identifying that the plurality of pieces of identified semantic information do not match, identifying, as the misrecognized clothing management symbol, the first clothing management symbol corresponding to the identified candidate symbol information having the lowest reliability among the plurality of first clothing management symbols.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is an exemplary diagram illustrating a management type, a washing type, and semantic information of a clothing management symbol;

FIG. 7 is a flowchart schematically illustrating a method of controlling an electronic device to verify a recognition result for a clothing management symbol according to an embodiment of the disclosure;

DETAILED DESCRIPTION

Figure 1:
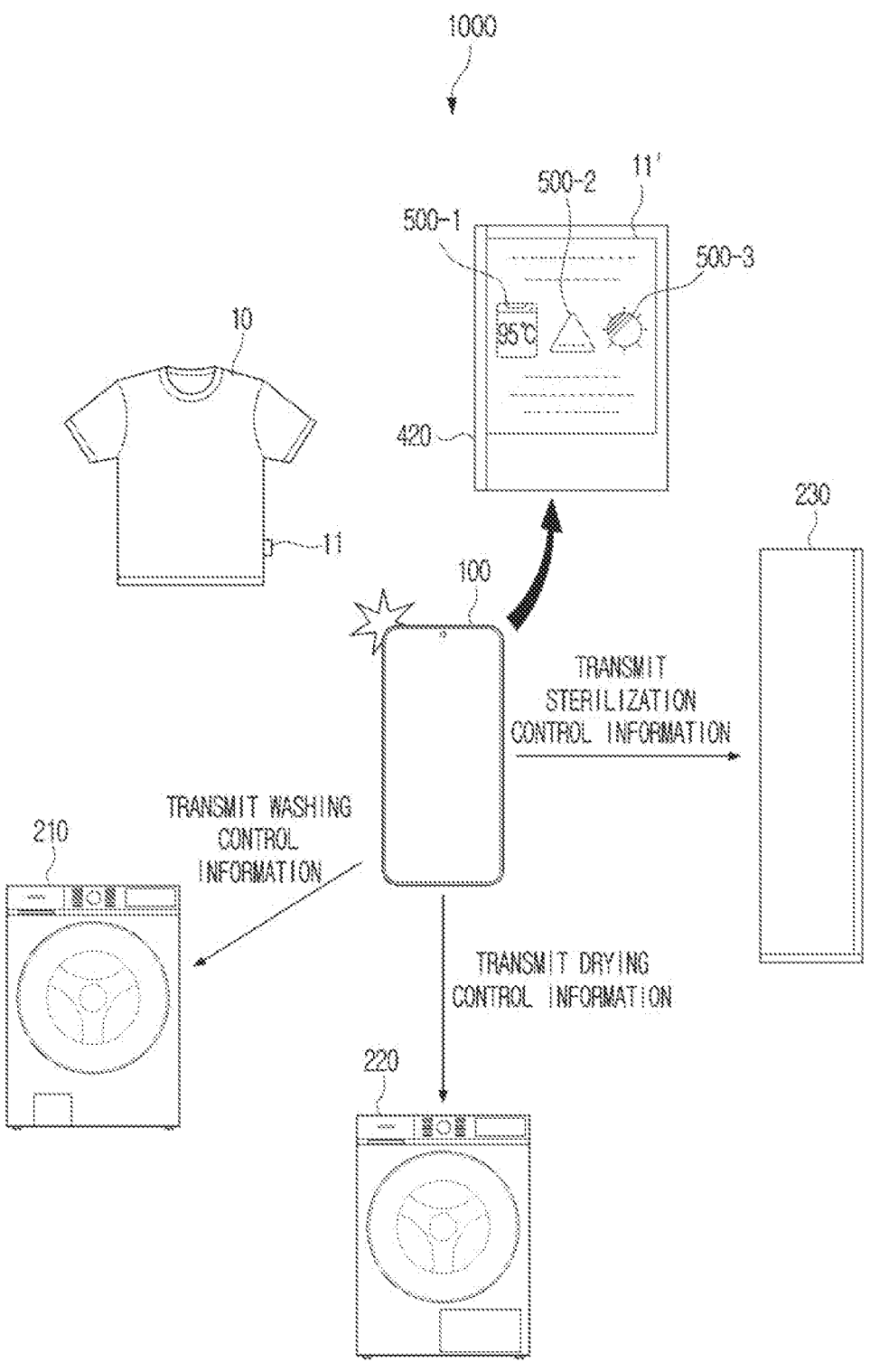
FIG. 1 is an exemplary diagram of an electronic device for generating management information according to an embodiment of the disclosure.

After terms used in the present specification are briefly described, the disclosure will be described in detail.

General terms that are currently widely used were selected as terms used in exemplary embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the t In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," at least one of "A and/or B," "one or more of A or B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first," "second," "1st" or "2nd" or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

An expression "~configured (or set) to" used in the disclosure may be replaced by an expression, for example, "suitable for," "having the capacity to," "~designed to," "~adapted to," "~made to," or "~capable of" depending on a situation. A term "~configured (or set) to" may not necessarily mean "specifically designed to" in hardware.

In any situation, an expression "~an apparatus configured to" may mean that the apparatus "is capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

Singular forms are intended to include plural forms unless the context clearly indicates otherwise. It should be understood that terms "include" or "comprise" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

In embodiments, a 'module' or a 'portion' may perform at least one function or operation, and be implemented by hardware or software or be implemented by a combination of hardware and software. In addition, a plurality of "modules" or a plurality of "~ers/~ors" may be integrated in at least one module and be implemented by at least one processor except for a "module" or a "~er/or" that needs to be implemented by specific hardware.

Various elements and regions in the drawings are schematically illustrated. Therefore, the spirit of the disclosure is not limited by relatively sizes or intervals illustrated in the accompanying drawings.

Hereinafter, an embodiment of the disclosure will be described in detail with reference to the accompanying drawings.

FIG. 1 is an exemplary diagram of an electronic device 100 for generating management information according to an embodiment of the disclosure.

Referring to FIG. 1, according to an embodiment of the disclosure, an electronic device 100 generates management information on clothing 10. Here, the management information may be information about washing, drying, sterilizing, deodorizing, etc., of the clothing 10. For example, the electronic device 100 may generate information on a washing method, washing time, washing intensity, etc., of the clothing 10 as management information.

In this case, the electronic device 100 may generate management information according to the management type of the clothing 10. That is, the electronic device 100 may generate management information on the clothing 10 according to the management type, such as management information on washing, management information on drying, and management information on sterilization.

The electronic device 100 may generate the management information on the clothing 10 and then transmit the management information to the external electronic device 200 or transmit a control signal corresponding to the management information. Here, the external electronic device 200 is an electronic device 100 that performs a function of managing the clothing 10 and may include a washing machine 210, a dryer 220, a clothing manager 230, etc. However, the disclosure is not limited thereto, and the external electronic device 200 may also include a server device that is linked with the electronic device 100 to transmit and receive the information on the clothing 10 to and from the external electronic device 200 and the electronic device 100.

The electronic device 100 according to an embodiment of the disclosure may generate appropriate management information according to characteristics of each clothing 10, such as color and ingredient of the clothing 10. To this end, the electronic device 100 may generate management information based on a clothing management symbol 500 included in a label 11 of the clothing 10. The label 11 of the clothing 10 may include information on the management of the clothing 10 in the form of clothing management symbols 500-1, 500-2, and 500-3 (hereinafter referred to as 500). The clothing management symbol 500 is a symbol representing a management method suitable for the clothing 10 that reflects the characteristics of the ingredients, etc., of the clothing 10. Accordingly, the electronic device 100 acquires the label image 420 for the label 11 attached to the clothing 10, and identifies the characteristics of the clothing 10 based on a label 11' in the acquired image 420 and the clothing management symbol 500 included in the label 11' and then generates appropriate management information fitting the clothing 10.

However, when the electronic device 100 incorrectly recognizes the clothing management symbol 500, the characteristics of the clothing 10 may be incorrectly recognized. Accordingly, the electronic device 100 may generate inappropriate management information on the clothing 10, which may cause damage to the clothing 10. Therefore, the electronic device 100 according to an embodiment of the disclosure performs a process of verifying whether the recognition result for the clothing management symbol 500 identified by the electronic device 100 is accurate. In other words, by verifying whether the recognition result for the clothing management symbol 500 is accurate, the electronic device 100 generates more accurate management information.

Specifically, the electronic device 100 may recognize the clothing management symbol 500 included in the label 11 of the clothing 10 and then verify the recognition result for the clothing management symbol 500 based on the recognition result (more specifically, information on the clothing management symbol 500 included in the recognition result) to determine whether there is the incorrectly recognized clothing management symbol 500. In addition, the electronic device 100 may acquire more accurate recognition results by selecting the incorrectly recognized clothing management symbols 500 and correcting the recognition results for the incorrectly recognized clothing management symbols 500.

In addition, the electronic device 100 may generate management information based on the clothing management symbol 500 included in the label 11 of the clothing 10 even for management types not included in the label 11 of the clothing 10. For example, when the label 11 of the clothing 10 does not include the clothing management symbol 500 for drying but includes the clothing management symbol 500 for washing and sterilization, the electronic device 100 may determine the appropriate drying method for the clothing 10 based on the clothing management symbol 500 for washing and sterilization.

Specifically, the electronic device 100 may generate the washing and sterilization information on the clothing 10 based on the clothing management symbol 500 for the washing and sterilization, and then identify the characteristics of the clothing 10 based on the generated washing and sterilization information and infer and determine the drying method appropriate for the characteristics of the clothing 10. In other words, the electronic device 100 may identify the material, type, etc., of the clothing 10 based on the washing method, the washing time, the washing temperature, etc., and infer the drying method suitable for the material, type, etc., of the identified clothing 10. The electronic device 100 may generate drying information (i.e., drying time and drying intensity) corresponding to the inferred drying method.

In this way, the electronic device 100 may generate and provide drying information (i.e., drying time, drying intensity, etc.) to the user even for the drying method that the user may not recognize from the label 11 of the clothing 10.

In FIG. 1, the electronic device 100 is shown as a smart phone, but the electronic device 100 according to the disclosure is a device that generates the management information on the clothing 10, and may include at least one of a TV, a tablet PC, a desktop PC, or a laptop PC. In addition, the electronic device 100 may include a washing machine 210, a dryer 220, a clothing manager 230, etc., that may perform a function of managing the clothing 10. For example, when the electronic device 100 is implemented as the washing machine 210, the washing machine 210 may directly recognize the clothing management symbol 500 included in the label 11 of the clothing 10, generate washing information of the washing machine 210, and then directly perform an operation corresponding to the generated washing information.

In addition, the electronic device 100 may be implemented as a server device including an application server, a database server, etc. For example, when the electronic device 100 is implemented as a server device, the electronic device 100 may generate the management information on the clothing 10 based on the information on the clothing management symbol 500 included in the label 11 acquired through the user terminal. The electronic device 100 may transmit the generated management information on the clothing 10 to the user terminal. However, hereinafter, for convenience of explanation of the disclosure, the electronic device 100 will be described assuming that it is a smart phone.

Hereinafter, an embodiment of the disclosure will be described in more detail with reference to FIGS. 2 to 14.

Figure 2:
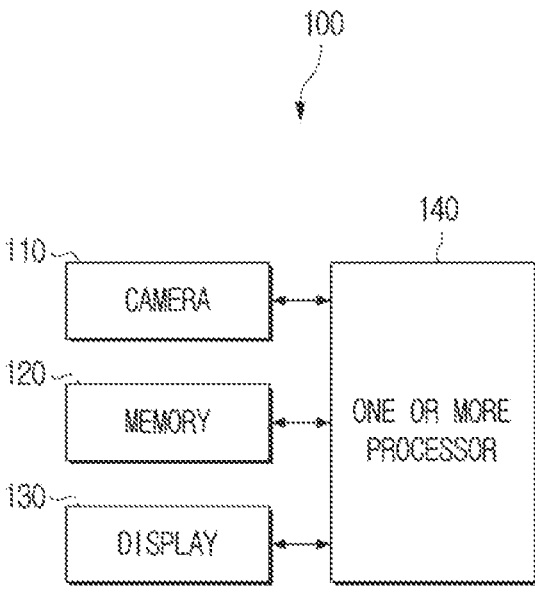
FIG. 2 is a schematic configuration diagram of the electronic device according to an embodiment of the disclosure.

FIG. 2 is a schematic configuration diagram of the electronic device 100 according to an embodiment of the disclosure. Referring to FIG. 2, the electronic device 100 may include a camera 110, a memory 120, a display 130, and at least one processor 140.

The camera 110 captures an object (or subject) around the electronic device 100 included in a captured area to acquire an image of the object. For example, the electronic device 100 may acquire a clothing image by capturing clothing using the camera 110, or acquire a label image by capturing a label on clothing. To this end, the camera 110 may be implemented as an imaging device such as a CMOS image sensor (CIS) having a CMOS structure, a charge coupled device (CCD) having a CCD structure, or the like.

However, the camera 110 is not limited thereto, and the camera 110 may be implemented as a camera 110 module of various resolutions capable of capturing an object (or subject). The camera 110 may be implemented as a depth camera 110 (e.g., IR depth camera 110, etc.), a stereo camera 110, an RGB camera 110, or the like.

The memory 120 may store at least one instruction. In addition, the memory 120 may store an operating system (O/S) for driving the electronic device 100. In addition, the memory 120 may store software programs or applications for operating the electronic device 100 according to various embodiments of the disclosure. In addition, the memory 120 may store various types of information such as various types of data input, set, or generated during execution of programs or applications.

The display 130 may display various types of visual information. For example, the processor may display clothing management information through the display 130. In addition, the display 130 may display various information related to clothing, such as acquired label images.

To this end, the display 130 may be implemented by various types of displays 130 such as a liquid crystal display (LCD), an organic light emitting diodes (OLED) display 130, a quantum dot light-emitting diodes (QLED) display 130, a plasma display panel (PDP), and the like. A driving circuit, a backlight unit, and the like, that may be implemented in a form such as TFT, low temperature poly silicon (LTPS) TFT, an organic TFT (OTFT), and the like, may be included in the display 130. The display 130 may be implemented as a flexible display, a 3D display, or the like.

The display 130 may be implemented by a touch screen together with a touch panel. In this case, the display 130 may function as an output unit outputting information between the electronic device 100 and the user, and at the same time, function as an input unit providing an input interface between the electronic device 100 and the user.

One or more processors 140 are electrically connected to the camera 110, memory 120, and display 130, and execute at least one instruction stored in the memory 120 to control the overall operation and function of the electronic device 100.

One or more processors 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. One or more processors 140 may control one or any combination of other components of the electronic device 100 and may perform operations related to communication or data processing. One or more processors 140 may execute one or more programs or instructions stored in the memory 120. For example, one or more processors 140 may perform the method according to an embodiment of the disclosure by executing one or more instructions stored in the memory 120.

When the method according to an embodiment of the disclosure includes a plurality of operations, the plurality of operations may be performed by one processor or by a plurality of processors. For example, when a first operation, a second operation, and a third operation are performed by the method according to an embodiment, the first operation, the second operation, and the third operation may all be performed by a first processor, the first operation and the second operation may be performed by the first processor (e.g., a general-purpose processor), and the third operation may be performed by a second processor (e.g., an artificial intelligence-specific processor).

The one or more processors 140 may be implemented as a single core processor including one core, or one or more multicore processors including a plurality of cores (e.g., homogeneous multicore or heterogeneous multicore). When one or more processors 140 are implemented as a multicore processor, each of the plurality of cores included in the multicore processor may include an internal memory 120 of the processor 140 such as a cache memory 120 and an on-chip memory 120, and a common cache shared by a plurality of cores may be included in a multicore processor. In addition, each of the plurality of cores (or some of the plurality of cores) included in the multi-core processor may read and perform program instructions for implementing the method according to an embodiment of the disclosure, and all (or part) of the plurality of cores may be linked to read and perform program instructions for implementing the method according to an embodiment of the disclosure.

When the method according to an embodiment of the disclosure includes a plurality of operations, the plurality of operations may be performed by one of a plurality of cores included in a multicore processor, or may be performed by the plurality of cores. For example, when the first operation, the second operation, and the third operation are performed by the method according to an embodiment, the first operation, the second operation, and the third operation may all be performed by the first processor in the multicore processor, the first operation and the second operation may be performed by a first core included in the multicore processor, and the third operation may be performed by a second core included in the multicore processor.

In an embodiment of the disclosure, the processor 140 may be a system-on-chip (SoC) in which one or more processors and other electronic components are integrated, a single-core processor, a multi-core processor, or a core included in the single-core processor or the multi-core processor. Here, the core may be implemented as CPU, GPU, APU, MIC, DSP, NPU, a hardware accelerator, a machine learning accelerator, or the like, but embodiments of the disclosure are not limited thereto.

Hereinafter, for convenience of description, one or more processors 140 will be referred to as the processor 140.

Figure 3:
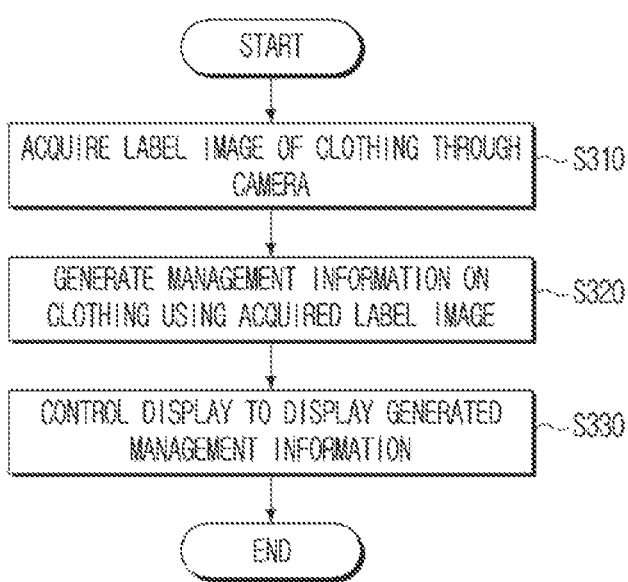
FIG. 3 is a flowchart of a method of controlling an electronic device according to an embodiment of the disclosure.

FIG. 3 is a flowchart of a method of controlling an electronic device 100 according to an embodiment of the disclosure.

Referring to FIG. 3, the processor 140 acquires a label image 420 of the clothing 10 through the camera 110 (S310). Here, the label 11 may be paper, cloth, or the like that includes a price, a brand name, and a product name of the product 10, a product number of the clothing 10, the characteristics (e.g., ingredient, color, material, mixing ratio, etc.) of the clothing 10, management information on the clothing 10, and other information on the clothing 10.

The processor 140 may control the camera 110 to acquire an image (i.e., label image 420) for the label 11. In this case, the processor 140 may display a UI, which guides the capturing of the label, on the display 130 so that a user may acquire an accurate label image 420. Here, the location of the UI may be set on the display 130 based on the size of the label image 420 to be acquired. In addition, the processor 140 may identify the resolution, size, or the like of the acquired label image 420 and request the user to recapture the label image 420. Specifically, the processor 140 may display a message requesting the recapturing of the label image 420 on the display 130 or output the message in the form of a voice through an output interface.

The processor 140 may acquire the label image 420 (S310) and then generate the management information on the clothing 10 using the acquired label image 420 (S320).

Specifically, the processor 140 may acquire the information on the clothing 10 included in the label 11 based on the label image 420. For example, based on the label image 420, the processor 140 may acquire the information on the clothing 10 written on the label 11, such as the ingredient, material, color, and mixing ratio of the clothing 10. In addition, the processor 140 may generate appropriate management information fitting the clothing 10 based on the acquired information.

For example, the processor 140 may identify the characteristics of the clothing 10 based on the label image 420 or identify the washing method of the clothing 10 described in the label image 420 to determine the washing method of the clothing 10. In addition, the processor 140 may generate the washing information on the clothing 10 based on the determined washing method. Here, the washing information may include text, images, etc., indicating the washing method of the clothing 10. In addition, the processor 140 may generate various management information related to the clothing 10, such as drying, deodorization, and sterilization, based on the acquired information on the clothing 10.

In this case, the processor 140 may generate the management information on the clothing 10 based on the clothing management symbol 500 included in the label 11 of the clothing 10. Specifically, the processor 140 may identify the clothing management symbol 500 in the label image 420 and then identify the method of managing the clothing 10 described on the label 11, such as a washing method and drying method of the clothing 10, based on the identified clothing management symbol 500. In addition, the processor 140 may generate the management information on the clothing 10 based on the method of managing the clothing 10 identified based on the clothing management symbol 500.

To this end, the processor 140 may first identify the clothing management symbol 500 within the label image 420. Specifically, the processor 140 may perform an object recognition process for each clothing management symbol 500 included in the label image 420. Here, the object recognition process for each clothing management symbol 500 may be a process of recognizing the clothing management symbol 500 included in the label image 420 to identify the meaning (e.g., context information) of the clothing management symbol 500 and the management type and standard type of the clothing management symbol 500. For example, the processor 140 may identify the clothing management symbol 500 within the label image 420 based on an object recognition algorithm.

The management type may be a type that indicates a method of managing the clothing 10, such as a washing method or drying method of the clothing 10. For example, washing, drying, dry cleaning, ironing, etc., regarding the clothing 10 may be included in the management type. That is, the processor 140 may identify the management type of each clothing management symbol 500 by determining whether each clothing management symbol 500 is related to water washing or dry cleaning. However, it is not limited thereto and the management type may be further subdivided or divided into various forms. For example, the management type may be further subdivided or divided according to the type of information, such as whether the washing is related to the hand washing or the temperature of washing water.

In addition, the standard type may be an international standard type including the clothing management symbol 500 or an organization type that defines and is in charge of an international standard type including a washing symbol. For example, each clothing management symbol 500 may be classified into types such as an ASTM standard type, an ISO standard type, a KS standard type according to the international standard type. In this case, since each country uses the clothing management symbol 500 of one international standard type, the standard type may be the country type in which the clothing management symbol 500 is used. The processor 140 may identify the standard type of each clothing management symbol 500 by determining which international standard type symbol each clothing management symbol 500 corresponds to.

Semantic information may be information represented by each clothing management symbol 500. Even if there are a plurality of clothing management symbols 500 belonging to the same management type, the information represented by each clothing management symbol 500 may be different. For example, even in the case of the plurality of clothing management symbols 500 included in the same water washing type, the specific clothing management symbol 500 may be a symbol representing the hand washing, and another specific clothing management symbol 500 may be a symbol representing the washing temperature. The semantic information may be referred to as context information, content information, etc. The semantic information may be identified based on at least one piece of context information corresponding to each clothing management symbol 500. For example, the semantic information may be identified as a combination of a plurality of contexts corresponding to (or matched to) the clothing management symbol 500.

FIG. 4 is an exemplary diagram illustrating a management type, a washing type, and semantic information of the clothing management symbol 500.

Referring to FIG. 4, a management type of a first clothing management symbol 511', a second clothing management symbol 512", a third clothing management symbol 513', and a fourth clothing management symbol 514' is washing, but a management type of a fifth clothing management symbol 515' and a sixth clothing management symbol 516' is drying, and therefore, the management types are different from each other. In addition, the first clothing management symbol 511', the second clothing management symbol 512', the third clothing management symbol 513', and the fourth clothing management symbol 514' have the same management type (i.e., washing). However, the standard type of the first clothing management symbol 511', the second clothing management symbol 512', and the third clothing management symbol 513' may be a KS standard, while the standard type of the fourth clothing management symbol 514' may be an ASTM standard, and therefore, the standard types are different from each other. In addition, even though it corresponds to the same management type (i.e., washing) and the same standard type (i.e., KS standard), the first clothing management symbol 511' indicates recommending washing in water at 40° C., the second clothing management symbol 512' indicates recommending washing in water at 60° C., and the third clothing management symbol 513' indicates recommending hand washing in water at 30° C., and therefore, the semantic information on each of the first, second, and third clothing management symbols 511', 512', and 513' may be different.

Even clothing management symbols of different standard types may have the same semantic information. Referring back to FIG. 4, the first clothing management symbol 511' and the fourth clothing management symbol 514' respectively correspond to different standard types (specifically, the first clothing management symbol 511' is the KS standard type, and the fourth clothing management symbol 514' is the ASTM standard type.), but has the same semantic information that indicates recommending washing in water at 40° C.

The processor 140 may identify the management type, standard type, and semantic information of each clothing management symbol 500 and then identify the washing method corresponding to each clothing management symbol 500 (or corresponding to each management type). In addition, the processor 140 may generate the management information corresponding to each management type according to the identified washing method.

According to an embodiment of the disclosure, the processor 140 may input the label image 420 acquired through the camera 110 to the neural network model to acquire the information on the plurality of clothing management symbols 500 included in the label image 420.

To this end, the memory 120 may store the neural network model trained to recognize the plurality of clothing management symbols 500 included in the input image. For example, the neural network model may be a neural network model trained to recognize the plurality of clothing management symbols 500 included in the input image (i.e., the label image 420), and identify the standard type and management type of the plurality of recognized clothing management symbols 500. In addition, the neural network model may be pre-trained based on training data that includes the plurality of label images 420 and the standard type information and the management type information on each of the plurality of clothing management symbols 500 included in each label image 420, and then stored in the memory 120. For example, the neural network model trained to recognize the plurality of clothing management symbol 500 included in the input image 420 may be implemented as a convolutional neural network (CNN) model, a fully convolutional networks (FCN) model, a regions with convolutional neuron networks features (RCNN) model, a YOLO model, etc.

The processor 140 may input the label image 420 acquired through the camera 110 to the neural network model to acquire, as a result value, the information on the plurality of clothing management symbols 500 included in the label image 420. In this case, the information acquired by the processor 140 may include the standard type information and the management type information of each clothing management symbol 500, and may include location information (e.g., coordinate values of each clothing management symbol 500) of each clothing management symbol 500 within the label image 420.

The processor 140 may generate the management information (S320) and then control the display 130 to display the generated management information (S330). That is, the processor 140 may display the generated management information on the display 130. In this way, a user may recognize the method of managing the clothing 10 to which the label image 420 is attached (or corresponding to the label image 420).

Figure 5:
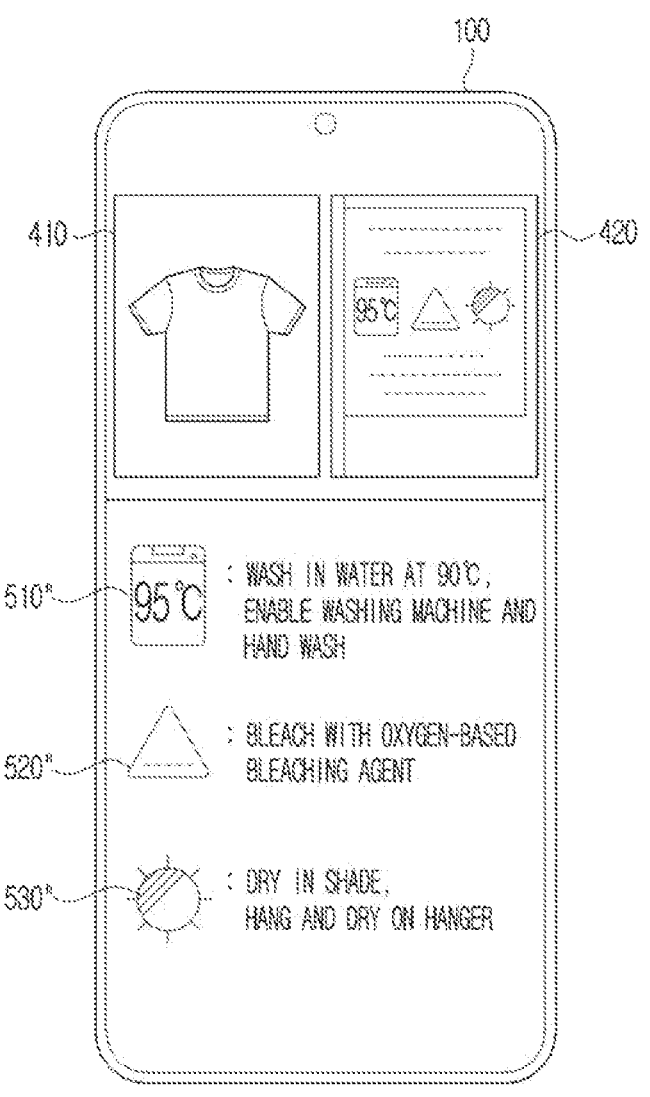
FIG. 5 is an exemplary diagram displaying clothing management information according to an embodiment of the disclosure.

FIG. 5 is an exemplary diagram displaying clothing 10 management information according to an embodiment of the disclosure.

Referring to FIG. 5, the processor 140 may display the clothing 10 management information generated based on the clothing management symbol 500 in the label image 420. In particular, the processor 140 may display the management information, which includes the label image 420, each clothing management symbol image 510", 520", and 530", and text representing a management method corresponding to each clothing management symbol 500, on the display 130.

Referring to FIG. 5, the processor 140 displays, on the display 130, the label image 420 and the clothing image 410 to which the label image 420 is attached together, thereby enabling the user to recognize the accurate management information on each clothing 10.

To this end, the processor 140 may perform a process of registering information on the user's clothing 10. Specifically, the processor 140 may acquire the user's clothing image 410 and the label image 420 corresponding to the clothing 10 together through the camera 110. In this case, the processor 140 may match the clothing image 410 and the label image 420 and store the matched clothing image 410 and label image 420 in the memory 120. In addition, the processor 140 may acquire the clothing 10 information (type, brand name, product name, etc., of the clothing 10) through the UI displayed on the display 130. Alternatively, the processor 140 may identify the clothing 10 information based on the acquired clothing image 410 and label image 420. In this case, the processor 140 may match the clothing image 410, the label image 420, and the acquired clothing 10 information and store the matched clothing image 410, label image 420, clothing 10 information in the memory 120. In addition, the processor 140 may match the clothing 10 management information generated based on the label image 420 with the user's clothing image 410 and label image 420 and store the matched clothing 10 management information and the user's clothing image 410 and label image 420 in the memory 120. In this way, the user may efficiently manage the user's clothing 10 by storing the user's clothing 10 information in the electronic device 100 and receiving appropriate management information on the user's clothing 10.

Figure 6:
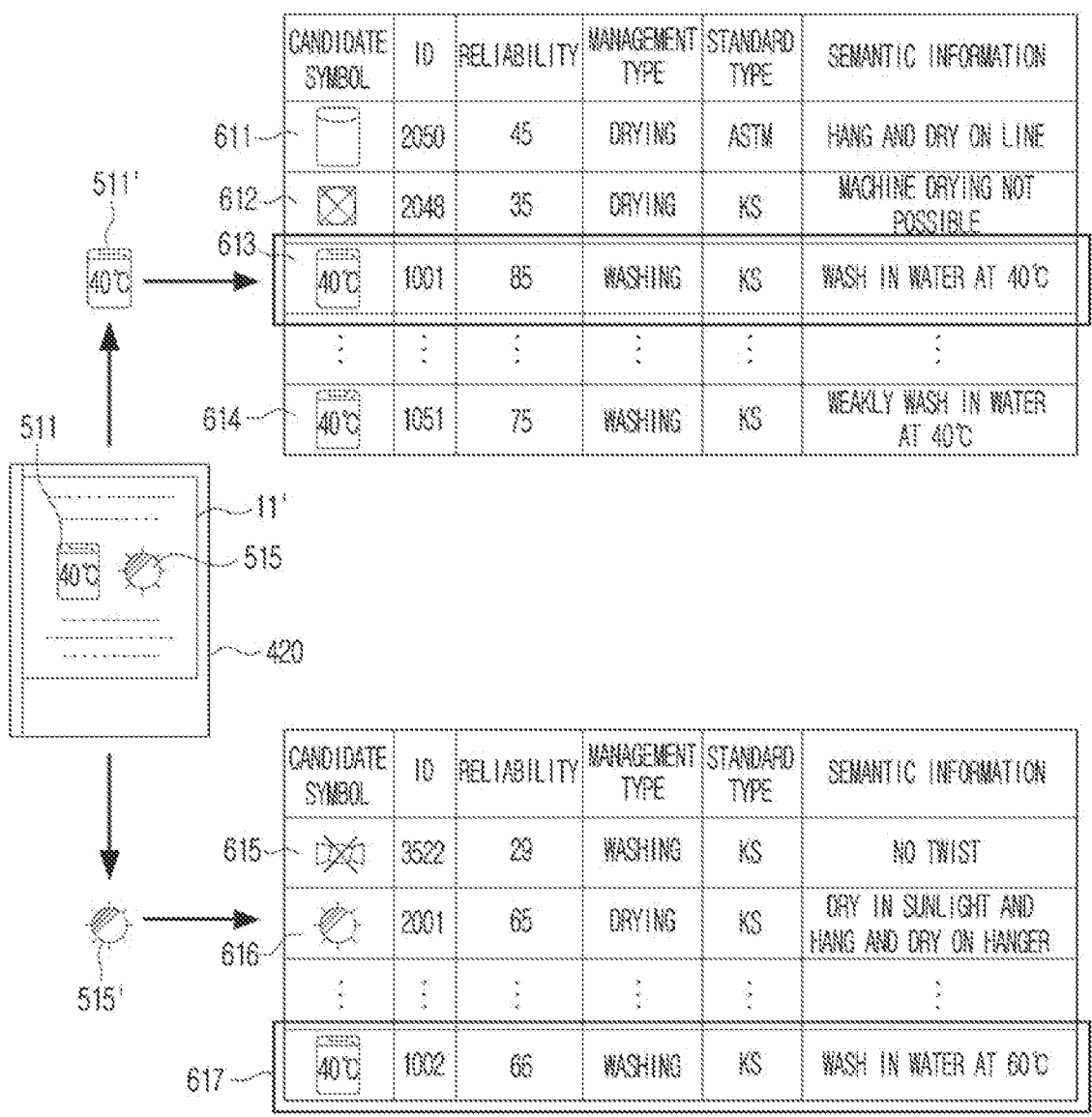
FIG. 6 is an exemplary diagram illustrating a method of obtaining reliability for candidate symbol information of a clothing management symbol according to an embodiment of the disclosure.

FIG. 6 is an exemplary diagram illustrating a method of acquiring reliability for candidate symbol information of the clothing management symbol 500 according to an embodiment of the disclosure.

According to an embodiment of the disclosure, the processor 140 may identify a plurality of candidate symbols for each clothing management symbol 500 and recognize any one of the plurality of candidate symbols as the clothing management symbol 500. Here, the candidate symbol may be a symbol that may be identified (or estimated) as the clothing management symbol 500, and the information on the plurality of candidate symbols may be stored in the memory 120. In this case, the processor 140 may calculate the reliabilities for the plurality of candidate symbols corresponding to the clothing management symbol 500, and identify a candidate symbol matching the clothing management symbol 500 from among the plurality of candidate symbols based on the calculated reliabilities. In addition, the processor 140 may recognize the clothing management symbol 500 based on the information on the candidate symbol that matches the clothing management symbol 500. Hereinafter, the candidate symbol identified as matching the clothing management symbol 500 among the plurality of candidate symbols will be referred to as a target symbol.

Specifically, the processor 140 may acquire the plurality of pieces of candidate symbol information on each clothing management symbol 500. The processor 140 may also calculate each of the reliabilities for the plurality of candidate symbols corresponding to each clothing management symbol 500. Here, the reliability may be a probability value that the clothing management symbol 500 may correspond to the plurality of candidate symbols.

In particular, when the processor 140 identifies each clothing management symbol 500 using the neural network model, the reliability may be a probability value acquired based on an activation function applied in an output layer of the neural network model. In this case, the candidate symbol may be referred to as a class. The processor 140 may acquire a plurality of probability values corresponding to the plurality of candidate symbols to which the clothing management symbol 500 may correspond, and identify each acquired probability value as the reliabilities for each candidate symbol. In addition, the processor 140 may identify a candidate symbol corresponding to the highest reliability among the plurality of reliabilities as the clothing management symbol 500. Hereinafter, for convenience of description of the disclosure, the description will be made assuming that the candidate symbol having the highest reliability among the plurality of candidate symbols is the target symbol.

Referring to FIG. 6, the processor 140 may acquire the plurality of reliabilities for a plurality of candidate symbols 611, 612, 613, and 614 for the first clothing management symbol 511. In this case, the processor 140 may identify the third candidate symbol 613 corresponding to the highest reliability value among the plurality of reliabilities as the target symbol. In addition, the processor 140 may identify the first clothing management symbol 511 as the third candidate symbol 613 which is the target symbol. The third candidate symbol 613 matches the first clothing management symbol 511 in that its management type is washing, its standard type is the KS standard, and its semantic information is recommending washing at 40° C. That is, the processor 140 acquired an accurate recognition result for the first clothing management symbol 511.

On the other hand, the processor 140 acquired an inaccurate recognition result for the fifth clothing management symbol 515. Specifically, in the case of the fifth clothing management symbol 515, the processor 140 may identify a seventh candidate symbol 617 corresponding to the highest reliability among the plurality of candidate symbols 615, 616, and 617 as the target symbol. In this case, in the case of the fifth clothing management symbol 515, the management type is drying, while the management type of the seventh candidate symbol 617 is washing. That is, the management types of the fifth clothing management symbol 515 included in the clothing label 11 and the seventh candidate management symbol 617 identified by the processor as a result for recognition of the fifth clothing management symbol 515 are different from each other.

In addition, the semantic information of the seventh candidate symbol 617 relates to recommending washing in water at 60° C., and is different from the semantic information of the fifth clothing management symbol 515 which recommends drying in sunlight. That is, the inaccurate recognition result was acquired for the fifth clothing management symbol 515 of the processor 140. Therefore, when the processor 140 generates management information based on the fifth clothing management symbol 515 that is misrecognized as the seventh candidate symbol 617, this results in providing the incorrect management information to the user. Therefore, the processor 140 performs a process of verifying the recognition result for the identified clothing management symbol 500. Hereinafter, an embodiment of the disclosure related thereto will be described in detail.

FIG. 7 is a flowchart schematically illustrating a method of controlling an electronic device 100 to verify the recognition result for the clothing management symbol 500 according to an embodiment of the disclosure.

Operations S710, S750, and S760 illustrated in FIG. 7 may correspond to operations S310, S320, and S330 illustrated in FIG. 3, respectively.

According to an embodiment of the disclosure, the processor 140 may identify a plurality of clothing management symbols 500 included in the label image 420 (S720). The processor 140 may extract a plurality of clothing management symbols 500 included in the label image 420 and identify the meaning or the like of each clothing management symbol 500. In particular, the processor 140 may identify the management type, the standard type, the context type, and the like of each clothing management symbol 500, identify a target symbol from among a plurality of candidate symbols 611 to 617 (hereinafter referred to as 610) corresponding to each clothing management symbol 500 to recognize each clothing management symbol 500, and acquire information on each clothing management symbol 500. In this regard, an embodiment of the object recognition process for each clothing management symbol 500 included in the above-described label image 420 may be equally applied.

In addition, the processor 140 may identify a misrecognized symbol from among the plurality of identified clothing management symbols 500 based on the standard type and management type of each of the plurality of identified clothing management symbols 500 (S730).

Here, the misrecognized symbol may be the clothing management symbol 500 having a misrecognition result among the plurality of clothing management symbols 500 (specifically, the plurality of clothing management symbols 500 included in the label image 420) identified by the processor 140. For example, when the processor 140 recognizes the clothing management symbol 500 based on the above-described reliability, the target symbol may be the clothing management symbol 500 that has not been correctly identified.

The processor 140 may use the standard type and the management type of each of the plurality of clothing management symbols 500 to identify the misrecognized symbols from among the plurality of clothing management symbols 500. As an example, the processor 140 may identify the clothing management symbol 500 having a different standard type as a misrecognized symbol based on the standard type of each of the plurality of clothing management symbols 500 or may identify any one of the plurality of clothing management symbols 500 corresponding to the same type as the misrecognized symbol based on the management type of each of the plurality of clothing management symbols 500.

Figure 8:
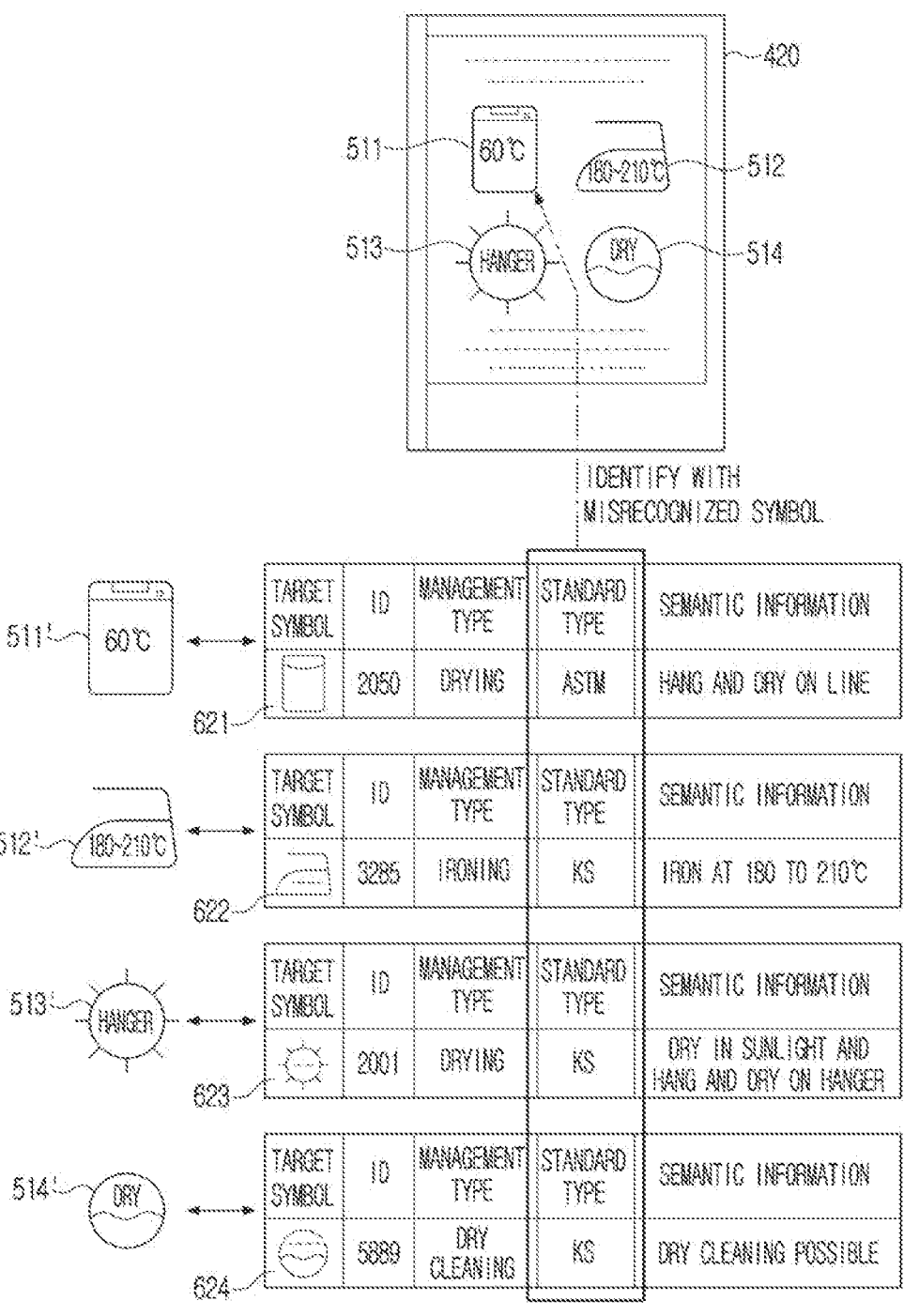
FIG. 8 is an exemplary diagram illustrating identifying a misrecognized symbol based on a standard type according to an embodiment of the disclosure.
Figure 9:
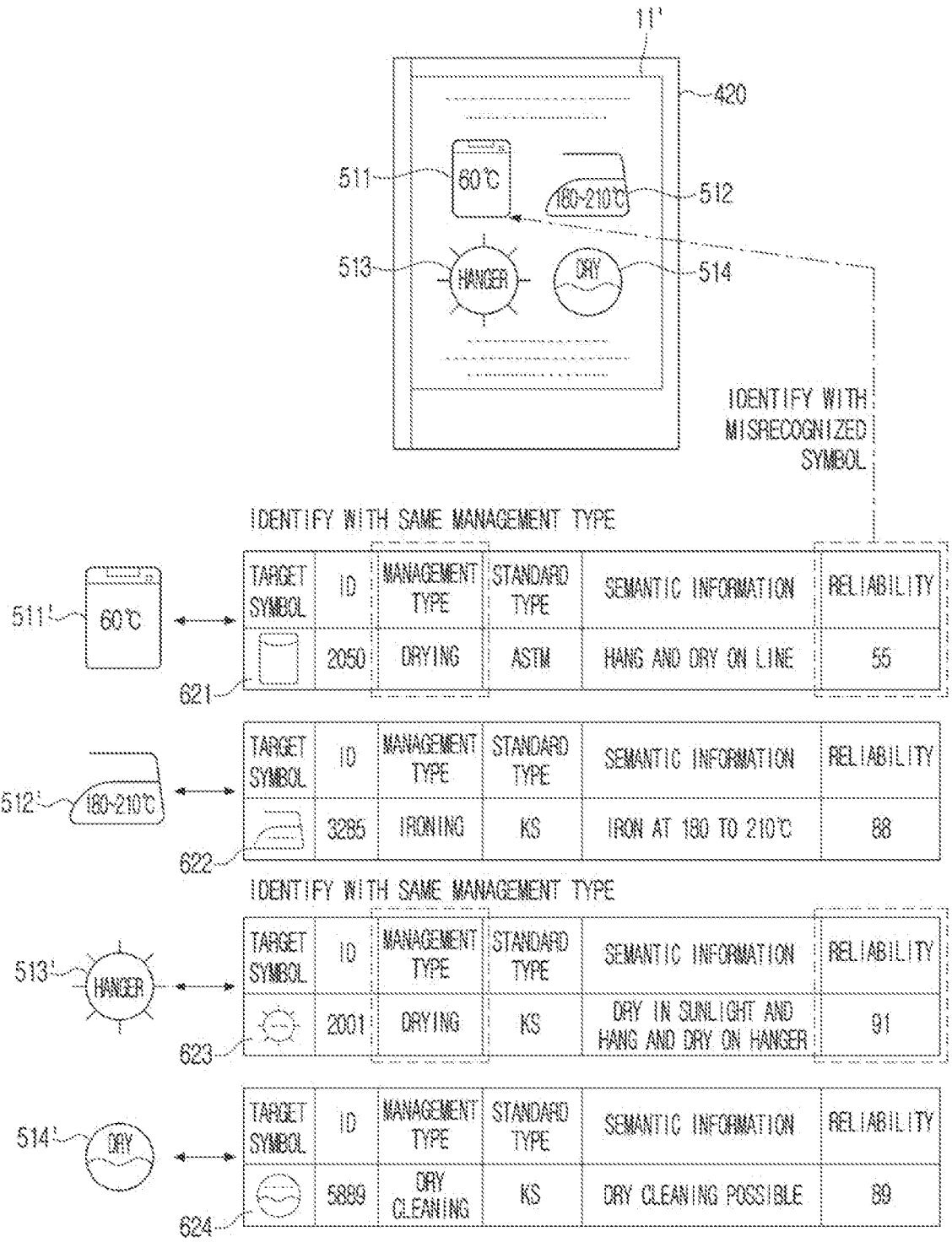
FIG. 9 is an exemplary diagram illustrating identifying a misrecognized symbol based on a management type according to an embodiment of the disclosure.

FIG. 8 is an exemplary diagram illustrating identifying a misrecognized symbol based on a standard type according to an embodiment of the disclosure. FIG. 9 is an exemplary diagram illustrating identifying a misrecognized symbol based on a management type according to an embodiment of the disclosure.

In this regard, according to an embodiment of the disclosure, the processor 140 may identify the misrecognized symbols by comparing the standard type of the candidate symbol information having the highest value among the calculated reliabilities and the standard type of other candidate symbol information. That is, the processor 140 may identify a management symbol having a different standard type among the plurality of clothing management symbols 500 as the misrecognized symbol.

To this end, the processor 140 may identify the standard type of the plurality of clothing management symbols 500. In particular, the processor 140 may identify the standard type of each management symbol based on the reliability. Specifically, the processor 140 may identify the candidate symbol having the highest reliability value among the plurality of candidate symbols 610 corresponding to each management symbol as the target symbol. In addition, the processor 140 may identify the standard type of the identified target symbol as the standard type of the clothing management symbol 500 corresponding to the target symbol. In this case, the processor 140 may identify at least one clothing management symbol 500 having a different standard type from among the plurality of clothing management symbols 500, and identify the at least one identified clothing management symbol 500 as the misrecognized symbol.

For example, referring to FIG. 8, when the processor 140 includes four clothing management symbols 511, 512, 513, and 514 in the label image 420, target symbols 621, 622, 623, and 624 corresponding to four clothing management symbols 511, 512, 513, and 514, respectively, may be identified based on the reliability. In this case, when the standard type of the target symbols 622, 623, and 624 of three clothing management symbols 512, 513, and 514 among the four clothing management symbols 511, 512, 513, and 514 is the KS standard, and the standard type of the target symbol 621 of the remaining one clothing management symbol 511 is the ASTM standard, the processor 140 may identify the clothing management symbol 511 corresponding to the target symbol 621 of the ASTM standard as the misrecognized symbol.

In addition, according to an embodiment of the disclosure, the processor 140 may identify the plurality of clothing management symbols 500 having the same management type of candidate symbol information having the highest reliability for each of the plurality of clothing management symbols 500, and identify the clothing management symbol 500 corresponding to the candidate symbol information having low reliability among the plurality of clothing management symbols 500 as the misrecognized symbol.

Specifically, when the plurality of clothing management symbols 500 corresponding to the same management type are identified from among the plurality of clothing management symbols 500, the processor 140 may identify any one of the plurality of clothing management symbols 500 as the misrecognized symbol.

To this end, the processor 140 may identify the management type of the plurality of clothing management symbols 500. In this case, the processor 140 may identify the management type of each management symbol based on the reliability. Specifically, the processor 140 may identify the candidate symbol having the highest reliability value among the plurality of candidate symbols 610 corresponding to each management symbol as the target symbol. Then, the processor 140 may identify the management type of the identified target symbol 620 as the management type of the clothing management symbol 500 corresponding to the target symbol.

In this case, the processor 140 may identify whether there are any management symbols 500 having the same management type among the plurality of clothing management symbols 500. Then, when it is identified that there are management symbols 500 among the plurality of clothing management symbols 500 corresponding to the same management type, the processor 140 identifies any one of the plurality of clothing management symbols 500 corresponding to the same management type as the misrecognized symbol.

The processor 140 may identify the reliabilities of each target symbol of the plurality of clothing management symbols corresponding to the same management type. In this case, the processor 140 may identify a clothing management symbol corresponding to a target symbol having a low reliability value among the plurality of clothing management symbols corresponding to the same management type as a misrecognized symbol.

For example, referring to FIG. 9, when the processor 140 includes four clothing management symbols 511, 512, 513, and 514 in the label image 420, target symbols 621, 622, 623, and 624 corresponding to four clothing management symbols 511, 512, 513, and 514, respectively, may be identified based on the reliability. In this case, when among the four clothing management symbols 511, 512, 513, and 514, the management type of the target symbols of two clothing management symbols 511 and 513 corresponds to drying, and the management type of the remaining two clothing management symbols 512 and 514 corresponds to ironing and dry cleaning, respectively, the processor 140 may identify two clothing management symbols 511 and 513 corresponding to the drying which is the same management type. Then, the processor 140 may compare the reliabilities of the target symbols 621 and 623 respectively corresponding to the two clothing management symbols (i.e., 511 and 513) corresponding to the drying type. Then, the processor 140 may identify the clothing management symbol corresponding to the target symbol having low reliability among the two clothing management symbols (i.e., 511 and 513) corresponding to the drying type as the misrecognized clothing symbol.

The processor 140 may also identify the plurality of pieces of semantic information corresponding to the plurality of clothing management symbols corresponding to the same management type, and when it is identified that the plurality of identified semantic information do not match, the processor 140 may identify a clothing management symbol corresponding to candidate symbol information having low reliability among the plurality of clothing management symbols corresponding to the same management type as the misrecognized symbol.

Specifically, the processor 140 may determine the meaning of a plurality of clothing management symbols corresponding to the same management type. To this end, the processor 140 may identify semantic information corresponding to each clothing management symbol corresponding to the same management type. Then, the processor 140 may compare each identified semantic information to identify whether each semantic information matches. That is, the processor 140 can identify whether the meanings of the plurality of clothing management symbols identified as the same management type conflict based on the semantic information. Also, when it is identified that the plurality of pieces of semantic information is not matched, the processor 140 may identify the meaning between the plurality of clothing management symbols corresponding to the same management type as conflicting, and identify whether there is the misrecognized symbol among the plurality of clothing management symbols. Therefore, the processor 140 may identify a clothing management symbol corresponding to a candidate symbol having a low reliability value among the plurality of clothing management symbols corresponding to the same management type as a misrecognized symbol (or mis-recognized symbol or first type symbol).

On the other hand, when the plurality of pieces of semantic information are identified as matching, the processor 140 may identify that the meanings between the plurality of clothing management symbols corresponding to the same management type do not conflict. Accordingly, the processor 140 may identify all of the plurality of clothing management symbols corresponding to the same management type as the normally recognized symbol (or normal-recognized symbol or second type symbol).

If there are three or more clothing management symbols corresponding to the same management type, the processor 140 may compare the semantic information of the plurality of clothing management symbols corresponding to the same management type, and identify the clothing management symbol having different semantic information as the mis-recognized symbol. That is, when the semantic information of two clothing management symbols matches and the semantic information of one clothing management symbol is different, the clothing management symbol corresponding to the different semantic information may be identified as the misrecognized symbol. When the semantic information of the plurality of clothing management symbols correspond-ing to the same management type is different, only the clothing management symbol having the highest reliability value may be identified as the normally recognized symbol, and the remaining two clothing management symbols may be identified as the misrecognized symbol.

Figure 10:
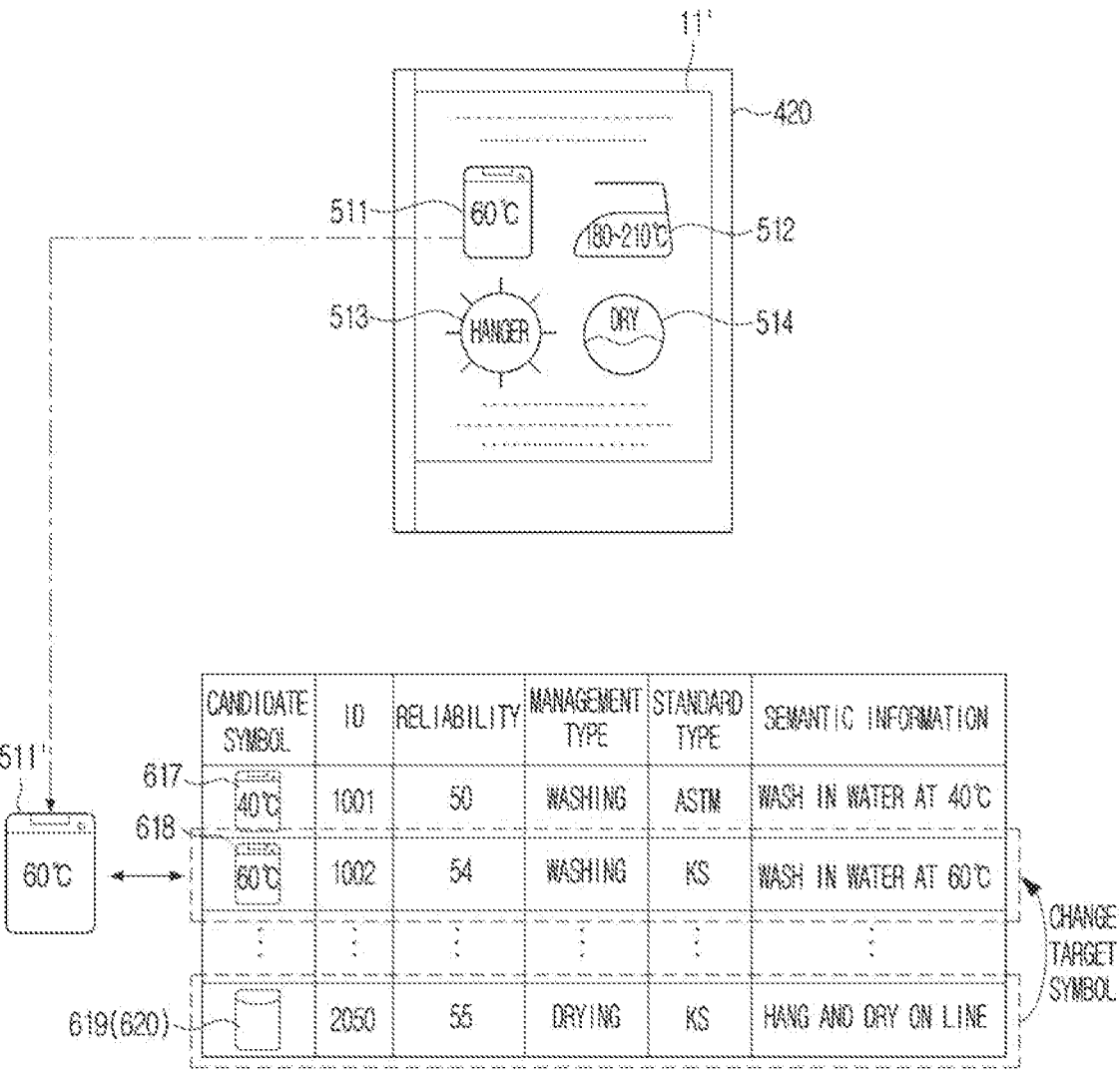
FIG. 10 is an exemplary diagram illustrating a method of correcting misrecognized symbols according to an embodiment of the disclosure.

FIG. 10 is an exemplary diagram illustrating a method of correcting misrecognized symbols according to an embodi-ment of the disclosure.

Referring back to FIG. 7, the processor 140 may correct the identified misrecognized symbol (S740). As an example, referring to FIG. 10, the processor 140 may correct the target symbol 620 of the identified clothing management symbol 511 identified as the misrecognized symbol with a candidate symbol 618 having the second highest reliability value among the plurality of candidate symbols 617, 618, and 619 of the clothing management symbol 511 identified as the misrecognized symbol. Then, the processor 140 may correct the recognition result for the clothing management symbol 511 identified as the misrecognized symbol based on the corrected target symbol 620.

The processor 140 corrects the misrecognized symbol (S740), generates the management information on the cloth-ing 10 (S750) using the label image 420, and control the display 130 to display the generated management informa-tion (S760). In this regard, the descriptions of S320 and S330 may be applied equally, and therefore, detailed descriptions thereof will be omitted.

The processor 140 may correct the identified misrecog-nized symbol based on at least one of the standard type and management type of another normally recognized symbol. Specifically, the processor 140 may correct the recognition result for the misrecognized clothing management symbol 500 based on at least one of the standard type and manage-ment type of the remaining normally recognized clothing management symbols 500, excluding the misrecognized clothing management symbol 500 from among the plurality of clothing management symbols 500.

For example, the processor 140 may correct the standard type of the misrecognized clothing management symbol 500 to match the remaining normally recognized clothing man-agement symbols 500. Specifically, when the misrecognized symbol is identified due to a different standard type, the processor 140 may identify the plurality of candidate man-agement symbols corresponding to the clothing manage-ment symbol 500 identified as the misrecognized symbol, sort the plurality of candidate management symbols in order of highest reliability value, and then re-identify, as the target symbol 620, the candidate symbol having the highest reli-ability value among the candidate symbols that follow the same standard type as the remaining normally recognized clothing management symbol 500. Then, the processor 140 may correct the recognition result for the clothing manage-ment symbol 500, which is identified as the misrecognized symbol, with the re-identified target symbol 620.

In addition, for example, the processor 140 may correct the management type of the misrecognized clothing man-agement symbol 500 based on the management type of the remaining normally recognized clothing management sym-bols 500. Specifically, the processor 140 may identify the management type of the normally recognized clothing man-agement symbol 500 and then identify the management type missing within the label. Then, the processor 140 may identify the plurality of candidate management symbols corresponding to the clothing management symbol 500 identified as the misrecognized symbol, sort the plurality of candidate management symbols in order of high reliability value, and then re-identify the candidate symbol having the highest reliability value from among the candidate symbols of the missing management type as the target symbol 620.

The processor 140 may reapply the above-described veri-fication method to the recognition result for the clothing management symbol 500 corresponding to the misrecog-nized symbol acquired after correcting the misrecognized symbol and repeatedly verify whether the recognition result according to the correction is appropriate.

Figure 11:
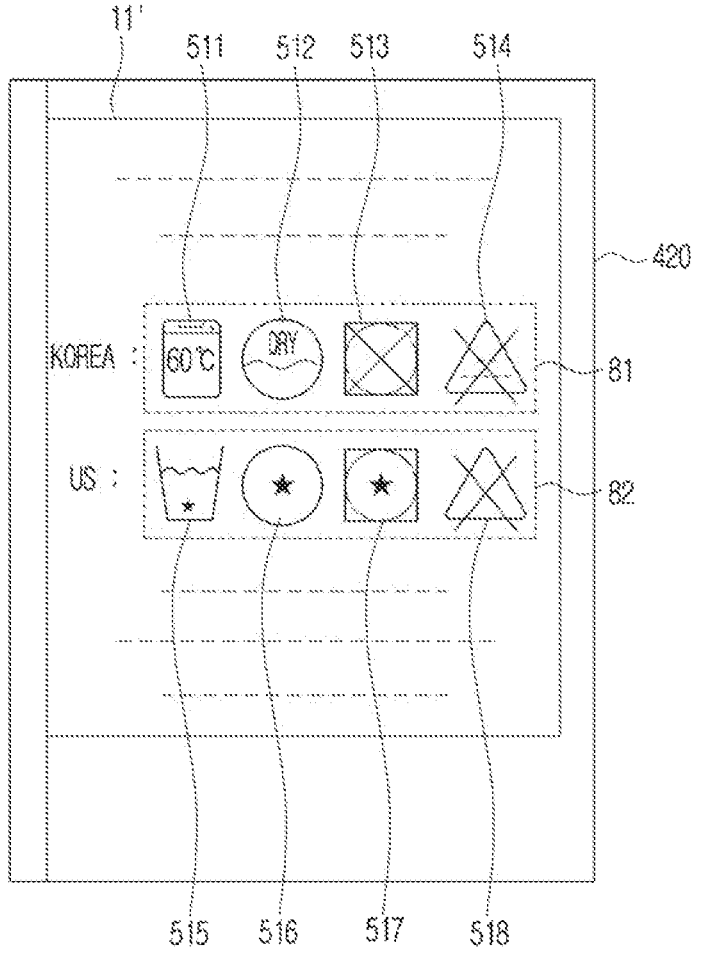
FIG. 11 is an exemplary diagram illustrating identifying the misrecognized symbol on a row-by-row basis according to an embodiment of the disclosure.

FIG. 11 is an exemplary diagram illustrating confirming the misrecognized symbol on a row-by-row basis according to an embodiment of the disclosure.

In addition, according to an embodiment of the disclosure, when the plurality of identified clothing management sym-bols 500 are arranged in a plurality of rows, the processor 140 may identify the misrecognized symbols on a row-by-row basis.

Specifically, the processor 140 may identify the locations of the plurality of clothing management symbols 500 within the label based on the label image 420. As an example, when the processor 140 inputs the label image 420 into the neural network model, the processor 140 may acquire the infor-mation on the neural network model as a result value. The information on the neural network model may include not only the management type, the standard type, and the context type of each clothing management symbol 500, but also the locations (e.g., coordinate values) of each clothing management symbol 500 within the label image 420. In this case, the processor 140 may identify the location of each clothing management symbol 500 within the label based on the location information of each clothing management sym-bol 500, and may identify the arrangement of the plurality of clothing management symbols 500 within the label image 420. Then, the processor 140 may identify the plurality of clothing management symbols 500 arranged in a plurality of rows. That is, the processor 140 may identify rows and number of rows formed by the plurality of clothing man-agement symbols 500 according to the arrangement form of the plurality of clothing management symbols 500 within the label. In this case, when the number of rows is plural, the processor 140 can identify misrecognized symbols on a row-by-row basis. That is, the processor 140 may identify on a row-by-row basis whether there is the misrecognized symbol among the plurality of clothing management symbols 500 included in the same row. Specifically, referring to FIG. 11, the processor 140 may identify whether there is the misrecognized symbol among four clothing management symbols 511, 512, 513, and 514 included in the first row 81, and may identify whether there is the misrecognized symbol among the four clothing management symbols 515, 516, 517, and 518 included in the second row 82.

In the label 11, a plurality of management symbols of a standard type corresponding to each row 80 may be written in a plurality of rows 81 and 82 (hereinafter referred to as 80) divided according to the standard type. Accordingly, the processor 140 may determine that the plurality of management symbols of the same standard type are written in each row 80, and identify the misrecognized symbol from among the plurality of management symbols of the same standard type. That is, the clothing management symbols 500 of different standard types or the plurality of clothing management symbols 500 corresponding to the same management type within the same row 80 may be identified based on each row 80.

The processor 140 may determine in advance the row 80 in which the misrecognized symbol may be identified among the plurality of rows 80. Specifically, the processor 140 may identify the number of identified standard types and the number of management types corresponding to each row 80 based on the management type and the standard type of the plurality of clothing management symbols 500 identified in each row 80. In this case, the processor 140 may determine the row 80 in which the misrecognized symbol may be identified among the plurality of rows 80 by comparing the number of identified standard types and the number of identified management types corresponding to each row 80. For example, when the standard types of four KS standards are identified in the first row, the standard types of four ASTM standards are identified in the second row, and the standard types of three ISO standards and the standard type of one KS standard are identified in the third row, the processor 140 may determine that the third row is a row in which the misrecognized symbol may be identified. Then, the processor 140 may determine and correct the misrecognized symbol in the third row.

Alternatively, when a management type of two washing types, a management type of one drying type, and a management type of one dry cleaning type are identified in the first row and the third row, respectively, and a management type of two washing types and a management type of two drying types are identified in the second row, the processor 140 may determine that the second row may be determined as a row in which the misrecognized symbol may be identified. That is, even if the plurality of first clothing management symbols corresponding to the same type are identified as being included in the first and third rows, the processor 140 may identify both the first and third rows as including the normally recognized symbols. Accordingly, the processor 140 may perform a process of identifying and correcting the misrecognized symbols only for the second row.

In addition, according to an embodiment of the disclosure, when it is determined that the label image 420 does not include the plurality of clothing management symbols 500, the processor 140 may identify the material of the clothing 10 based on the label image 420 and generate the management information on the clothing 10 based on the identified material.

Specifically, when the label image 420 does not include a plurality of clothing management symbols 500, the material of the clothing 10 may be used to generate the management information on the clothing 10. However, the disclosure is not limited thereto, and when it is identified that the number of the plurality of clothing management symbols 500 identified in the label image 420 is less than a preset number, the processor 140 may generate the management information on the clothing 10 based on the material of the clothing 10.

When the label image 420 does not include the clothing management symbol 500, the processor 140 may identify the material of the clothing 10. Here, the material of the clothing 10 may include the texture of the clothing 10, the mixing ratio of the clothing 10, and the color of the clothing 10. To this end, the processor 140 may acquire an image (that is, an image including a portion of the clothing 10) including the material information of the clothing 10 through the camera 110. In particular, when it is identified that the label image 420 does not include the clothing management symbol 500, the processor 140 may display a UI on the display 130 that guides a user to acquire an image including the material information of the clothing 10 (that is, guides a user to capture a portion of the clothing 10). In addition, the processor 140 may identify the material of the clothing 10 by inputting the acquired image to the neural network model. Here, the neural network model may be a neural network model trained to identify at least one of the color and texture of the clothing 10 in the input image.

In addition, the processor 140 may identify the material of the clothing 10 based on the information on the clothing 10 included in the label image 420 other than the clothing management symbol 500. For example, the processor 140 may extract the material information of the clothing 10 written on the label 11 or extract the information on the mixing ratio of the clothing 10 written on the label 11 to identify the material of the clothing 10. To this end, the processor 140 may use a neural network model trained to recognize text indicating the material information or mixing ratio information written on the label 11 and output the material information. That is, the processor 140 may input the label image 420 to the neural network model to acquire the material information corresponding to the material information or mixing ratio information of the clothing 10 included in the label image 420.

The neural network model trained to identify the texture of clothing 10 in the input image described above and the neural network model trained to output the material information by recognizing text indicating the material information or the mixing ratio information written in the label 11 may be the same model as the neural network model that recognizes the clothing management symbol 500 within the label image 420. In this case, the neural network model may output the recognition result for the material information or the clothing management symbol 500 as output values of different layers.

The processor 140 may identify the material of the clothing 10 and then generate the management information appropriate for the clothing 10 based on the material of the clothing 10. For example, when the material of the clothing 10 is identified as wool, the processor 140 may generate information recommending not to wash the clothing 10 with water as the washing information of the clothing 10 and generate information recommending the dry cleaning as the dry cleaning information.

When the clothing management symbol 500 is identified as being a preset type, the processor 140 may perform an additional recognition process for the clothing management symbol 500. Specifically, when the clothing management symbol 500 is identified as a rare type of symbol, the processor 140 may perform an additional recognition process to more accurately recognize the clothing management symbol 500.

In this regard, according to an embodiment of the disclosure, the candidate symbol information and the reliability for the candidate symbol information on each of the plurality of clothing management symbols 500 may be calculated, and when the candidate symbol information having the highest value among the calculated reliability is identified as the clothing management symbol 500 that is the first type, the identified clothing management symbol 500 may be identified as an unrecognized symbol.

Here, the first type may be a rare type as described above. In particular, when the processor 140 inputs the label image 420 to the neural network model and recognizes the plurality of clothing management symbols 500 included in the label image 420, the accuracy of the neural network model may vary depending on the number (or amount) of training data corresponding to each clothing management symbol 500. In the case of the clothing management symbol (500), which is used equally in many countries, the number of training data may be large. Therefore, since the neural network model is trained for the clothing management symbol 500 based on a large amount of training data, the accuracy of recognition results acquired through the neural network model may be high. On the other hand, in the case of the rare clothing management symbol 500, the number of training data may be small. Therefore, since the neural network model is trained for the clothing management symbol 500 based on a small amount of training data, the accuracy of recognition results acquired through the neural network model may be low. Accordingly, the processor 140 may perform a separate additional recognition process to increase the accuracy of the recognition result for the rare clothing management symbol 500.

The processor 140 may identify whether the clothing management symbol 500 corresponds to the rare type. In this case, the clothing management symbol 500 with less than a preset number of training data may become a rare clothing management symbol 500. Then, when it is identified that the clothing management symbol 500 is identified as being a rare type, the processor 140 may identify the clothing management symbol 500 as the unrecognized symbol.

In the case of the unrecognized symbols, since there is little training data, even if the target symbol 620 of the clothing management symbol 500 is corrected based on the reliability (more specifically, even if it is corrected with the candidate symbol having the second highest reliability value), the recognition result for the clothing management symbol 500 may still be inaccurate. Accordingly, the unrecognized symbol may be distinguished from the misrecognized symbol in which the target symbol 620 is corrected based on the reliability as the target symbol 620 is incorrectly identified.

The processor 140 may identify the clothing management symbol 500 corresponding to the target symbol 620 as the unrecognized symbol when the candidate symbol having the highest reliability value among the plurality of candidate symbols, that is, the target symbol 620 is a preset type (or preset class).

Alternatively, the processor 140 may identify the clothing management symbol 500 corresponding to the target symbol 620 as the unrecognized symbol when the candidate symbol having the highest reliability value among the plurality of candidate symbols, that is, the reliability value of the target symbol 620 is less than a preset value.

When the clothing management symbol 500 is identified as the unrecognized symbol, the processor 140 may acquire the clothing management symbol image corresponding to the unrecognized symbol based on the label image 420.

Specifically, the processor 140 may identify the clothing management symbol 500 that is identified as the unrecognized symbol in the label image 420 based on the location information of each clothing management symbol 500. Then, the processor 140 reduces, enlarges, or crops the label image 420 to obtain the image (hereinafter referred to as the clothing management symbol image) corresponding to the clothing management symbol 500 which is identified as the unrecognized symbol.

Then, the processor 140 may identify the standard type and management type of the unrecognized symbol based on the similarity between the acquired clothing management symbol image and the plurality of candidate symbol images.

To this end, the plurality of candidate symbol images may be stored in the memory 120. In particular, the plurality of candidate symbol images stored in the memory 120 may be images of candidate symbols corresponding to rare types. That is, the images for the plurality of clothing management symbols 500 corresponding to rare types may be stored in the memory 120 as the plurality of candidate symbol images.

The processor 140 may acquire similarity between each candidate symbol image and the clothing management symbol image by matching the acquired clothing management symbol image with the plurality of candidate symbol images stored in the memory 120. Specifically, the processor 140 may extract the features of the clothing management symbol image and each candidate symbol image, respectively, and embed each extracted feature into a three-dimensional vector. In this case, the processor 140 may acquire the three-dimensional vector corresponding to the features of the clothing management symbol image and each candidate symbol image based on the t-stochastic neighbor embedding (t-SNE) algorithm or the like. Then, the processor 140 may identify each three-dimensional vector in a preset three-dimensional space, and identify a Euclidean distance between the vector corresponding to the clothing management symbol image and each vector corresponding to each candidate symbol image. Then, the processor 140 may identify each identified Euclidean distance with the similarity between the clothing management symbol image and each candidate symbol image. In this case, the processor 140 may identify that the smaller the Euclidean distance, the higher the similarity between the clothing management symbol image and the candidate symbol image. The processor 140 may identify the similarity between the clothing management symbol image and the candidate management symbol image based on various methods such as a Mahalanobis distance and a cosine distance between vectors in addition to Euclidean distance.

The processor 140 may identify a candidate symbol image having the highest similarity from among the plurality of candidate symbol images, and recognize a clothing management symbol (i.e., an unrecognized symbol) corresponding to the clothing management symbol image based on the identified candidate symbol image. That is, the processor 140 may identify the candidate symbol corresponding to the candidate symbol image having the highest similarity as the target symbol 620, and recognize the clothing management symbol 500 corresponding to the unrecognized symbol based on the target symbol 620.

Figure 12:
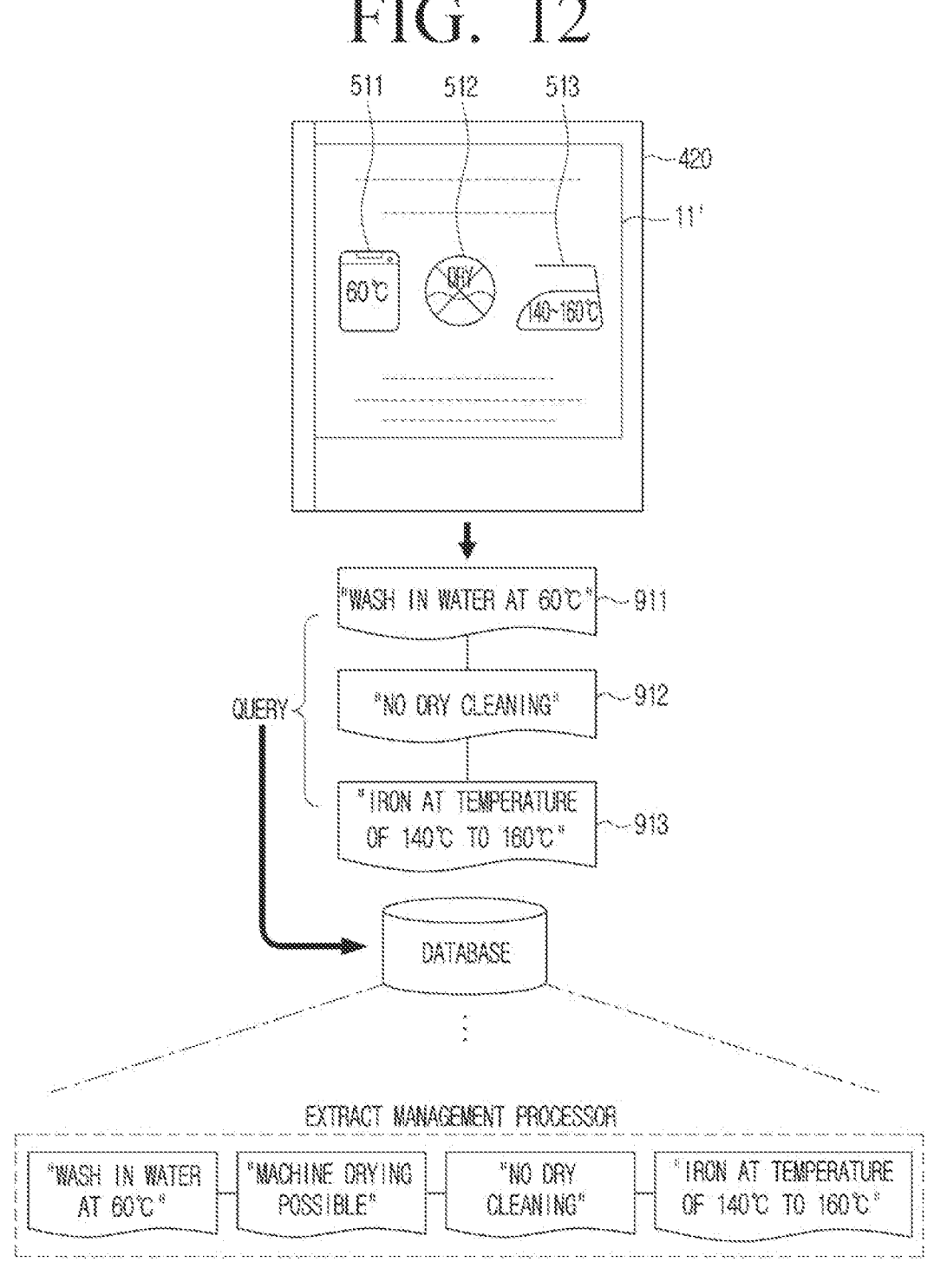
FIG. 12 is an exemplary diagram illustrating generating management information on a management type not identified in a label based on the management type of the clothing management symbol included in the label according to an embodiment of the disclosure.

FIG. 12 is an exemplary diagram illustrating generating the management information on a management type not identified in the label 11 based on the management type of the clothing management symbol 500 included in the label 11 according to an embodiment of the disclosure.

According to an embodiment of the disclosure, when the management type not included among the plurality of management types corresponding to the plurality of clothing management symbols 500 is identified, the processor 140 may acquire at least one management processor 140 information including the management information corresponding to the management type among the plurality of pieces of management process information based on the generated management information. In this case, the plurality of pieces of management process information may be a combination of the plurality of pieces of management information corresponding to the plurality of management types.

Specifically, the processor 140 may identify the plurality of clothing management symbols 500 included in the label image 420 and when the management type (specifically, the management type that is not identified using the plurality of clothing management symbols 500 included in the label image 420) missing (or not included) in the label image 420 is identified based on the management type information of each clothing management symbol 500, the processor 140 may generate the management information on the missing (or not included) management type based on the management information generated based on the plurality of clothing management symbols 500 included in the label image 420. Hereinafter, for convenience of description of the disclosure, the management type missing (or not included) in the label image 420 will be referred to as the first management type.

Referring to FIG. 12, when the label image 420 includes the plurality of clothing management symbols 511, 512, and 513 whose management type is washing, dry cleaning, and ironing, the processor 140 may generate each management information on washing, dry cleaning, and ironing. In particular, the processor 140 may generate management information on each management type based on the semantic information of each clothing management symbol 511, 512, and 513. Specifically, the processor 140 may generate management information 911 recommending washing in water at 60° ° C. for washing, management information 912 recommending prohibiting dry cleaning for dry cleaning, and management information 913 recommending ironing at a temperature of 140° ° C. to 160° C. for ironing. In this case, the processor 140 may generate management information on a first management type, for example, drying, that is not included in the label image 420 based on generated management information 911, 912, and 913.

For example, the processor 140 may acquire the management information on drying by using at least one of the generated management information (washing, dry cleaning, and ironing) as a query. In this case, the memory 120 may store the plurality of pieces of management process information in which the plurality of pieces of management information corresponding to the plurality of management types are combined. The processor 140 may identify the management information on washing and the management information on dry cleaning as a query (e.g., SQL query) from among the plurality of pieces of generated management information, and acquire at least one of the plurality of pieces of management process information based on the identified query.

Specifically, the processor 140 may acquire the management process information including the management information on the washing (management information recommending washing in water at 60° C.) and the management information on the dry cleaning (management information recommending prohibiting dry cleaning) generated from among the plurality of pieces of management process information.

Alternatively, the processor 140 may obtain management information not included in the label image 420 by transmitting the identified query information to the server through a communication interface.

Hereinafter, for convenience of description of the disclosure, the management process information acquired based on the management information generated among the plurality of pieces of management process information is referred to as first management process information.

The processor 140 may generate the management information corresponding to the first management type not included in the label 11, based on the acquired first management process information. Specifically, the processor 140 may extract the management information on drying from the acquired management process information and generate the management information on drying based on the extracted management information on drying.

In this case, the processor 140 may select only the first management process information including the management information of the first management type to be generated (i.e., a management type not identified in the label 11) among the plurality of acquired first management process information. That is, describing the above example again, the processor 140 may select first management process information including only the generation information on drying among the plurality of selected first management process information, and may generate management information on drying based on the selected first management process information.

In addition, when the plurality of pieces of acquired first management process information is more than a preset number, the processor 140 may generate the management information corresponding to the first management type not included in the label (or label image 420) based on the plurality of pieces of acquired first management process information. In this case, the processor 140 may extract the management information on the first management type from the acquired first management process information and then generate the management information on the first management type based on the management information having the weakest management strength among the extracted management information on the first type. Here, the management information having the weakest management strength may be management information having the lowest management temperature or the shortest management time. When the plurality of pieces of acquired first management process information is less than the preset number, the processor 140 may displays, on the display 130, a UI requesting to input management information on a management type not included, and match the input management information with the clothing 10 (more specifically, clothing image 410 and label image 420) and stored the input management information in the memory 120.

According to an embodiment of the disclosure, the processor 140 may transmit the management information corresponding to the management type to the device for processing clothing 10 corresponding to the management type through the communication interface included in the electronic device 100. In addition, the processor 140 may generate control information corresponding to the management information and transmit the generated control information to the device for processing clothing 10. For example, when the processor 140 generates the washing information on the clothing 10 based on the clothing management symbol 500 of the washing type among the plurality of clothing management symbols 500 included in the label image 420, the processor 140 may transmit washing information to a washing machine through a communication interface, or may transmit control information corresponding to the washing information.

Figure 13:
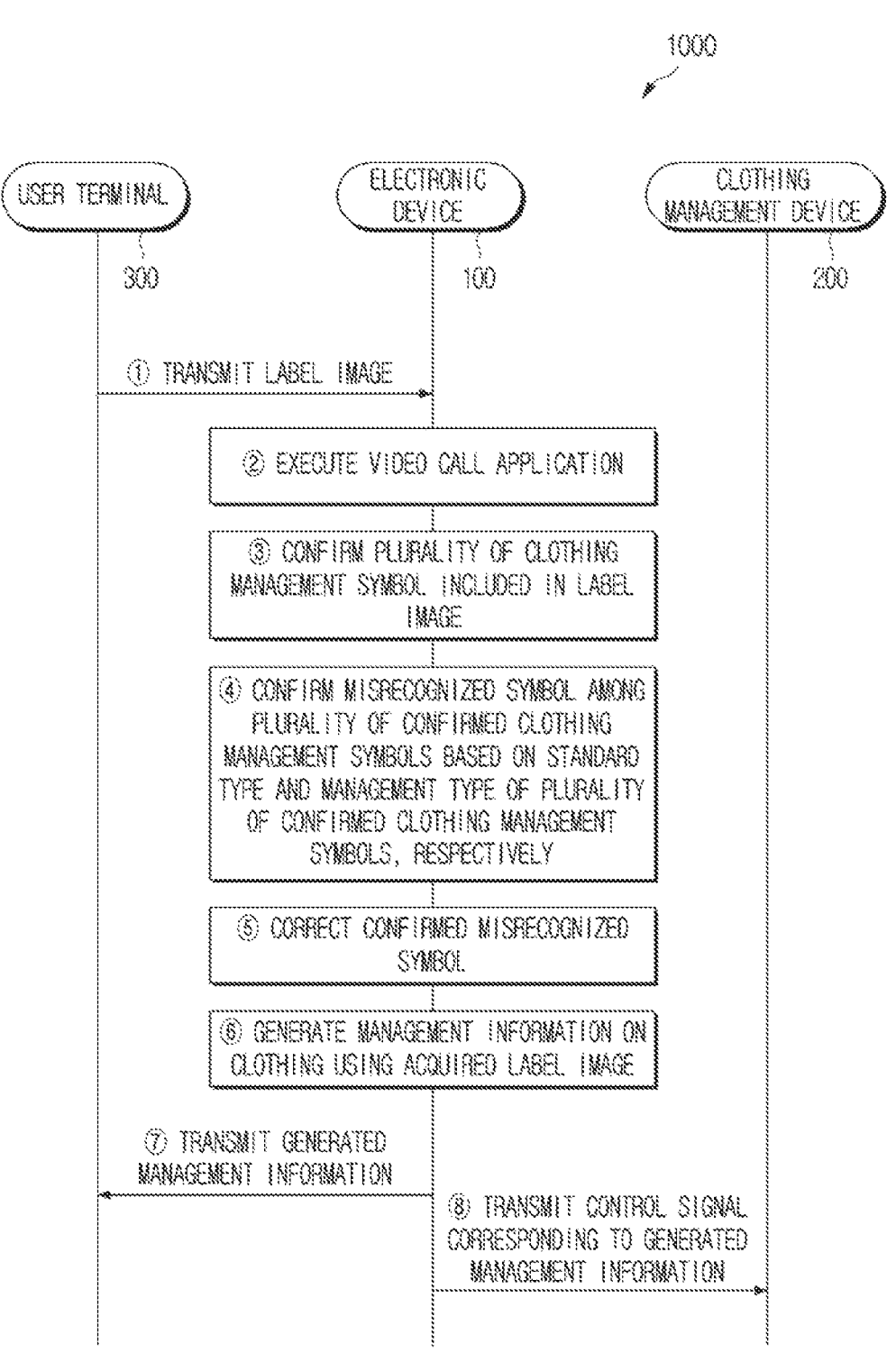
FIG. 13 is a sequence diagram of an electronic device implemented as a server device according to an embodiment of the disclosure.

FIG. 13 is a sequence diagram of the electronic device 100 implemented as a server device according to an embodiment of the disclosure.

Referring to FIG. 13, when the electronic device 100 is implemented as a server device, the electronic device 100 may receive the label image 420 from a user terminal included in a system 1000 for managing clothing 10. Here, the user terminal may be a user terminal that is registered in the server device and is linked with the server device.

In this case, the electronic device 100 may generate the management information on the clothing 10 using the received label image 420. In particular, the electronic device 100 may identify the plurality of clothing management symbols 500 included in the label image 420, confirms the misrecognized symbol among the plurality of identified clothing management symbols 500 based on the standard type and management type of each of the plurality of identified clothing management symbols 500, and correct the identified misrecognized symbol based on at least one of a standard type and a management type of another normally recognized symbol. In relation to this, the description of the disclosure described above may be equally applied.

The electronic device 100 may transmit the generated management information to the user terminal, and the user terminal may display the received management information on the display 130.

In addition, the electronic device 100 may transmit control information to at least one device for managing clothing 10 included in the system 1000 for managing clothing 10 based on the generated management information.

The electronic device 100 may generate a plurality of pieces of management information on each user for the plurality of pieces of clothing 10 registered by the user and store the generated management information in the memory 120 (or database), and in particular, may cluster the registered user's clothing 10 based on the management information or the clothing management symbol 500 included in the label image 420 of each clothing 10. For example, the electronic device 100 may cluster the clothing 10 that have the same clothing management symbol 500 for washing and drying among the plurality of pieces of registered clothing 10, and provide information recommending washing or drying to the plurality of pieces of clustered clothing 10 to the user. Of course, the above description may be equally applied even when the electronic device 100 is implemented as a smart phone.

Figure 14:
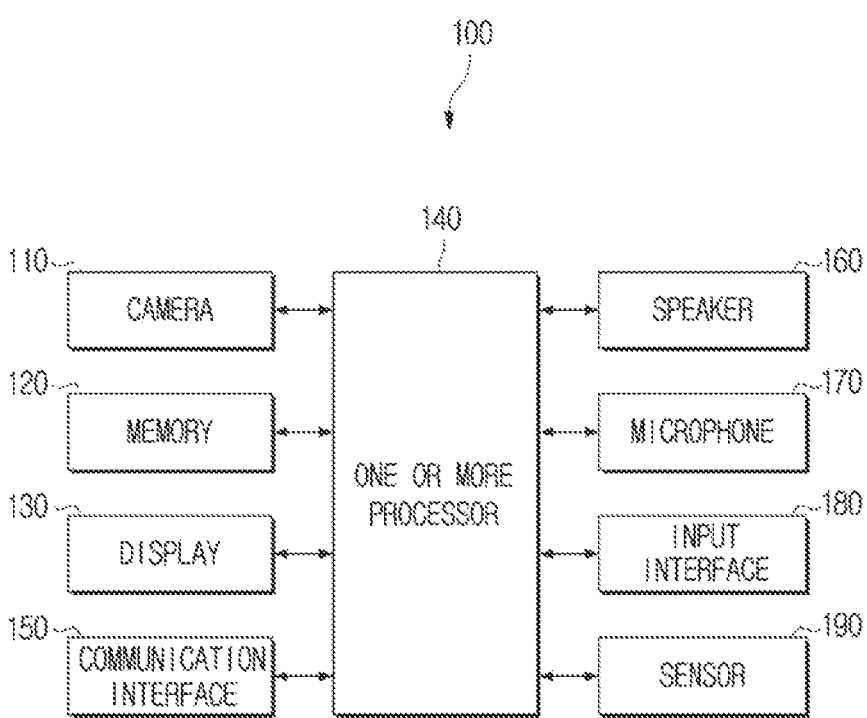
FIG. 14 is a detailed configuration diagram of the electronic device according to an embodiment of the disclosure.

FIG. 14 is a detailed configuration diagram of the electronic device 100 according to an embodiment of the disclosure. Referring to FIG. 14, the electronic device 100 includes a camera 110, a memory 120, a display 130, a communication interface 150, a speaker 160, a microphone 170, an input interface 180, a sensor 190, and one or more processors 140. A detailed description for components overlapped with components illustrated in FIG. 2 among components illustrated in FIG. 13 will be omitted.

The communication interface 150 may communicate with external devices and external servers through various communication methods. For example, the electronic device 100 may transmit a control signal corresponding to the generated management information to the device for managing clothing 10 through the communication interface 150. Alternatively, when the electronic device 100 is implemented as a server device, the electronic device 100 may acquire the label image 420 from the user terminal through the communication interface 150 and transmit the generated management information to the user terminal. Alternatively, when the electronic device 100 is implemented as a smart phone, the electronic device 100 may transmit the generated query to a server device that is linked with the electronic device 100 through the communication interface 150 and receive the management information on the first management type.

The communication connection between the communication interface 150 and an external device and an external server may include communication through a third device (e.g., repeater, hub, access point, gateway, etc.). For example, the external device may be implemented as another external electronic device 200, a server, cloud storage, a network, etc.

In addition, the communication interface 150 may include various communication modules to communicate with external devices. As an example, the communication interface 150 may include a wireless communication module, and a cellular communication module using at least one of, for example, 3RD Generation (3G), 3rd Generation Partnership Project (3GPP), Long Term Evolution (LTE), and LTE Advance (LTE-A), code division multiple access (CDMA), wideband CDMA (WCDMA), universal mobile telecommunications system (UMTS), wireless broadband (WiBro), or global system for mobile communications (GSM). As another example, the wireless communication module may include at least one of, for example, wireless fidelity (WiFi), Bluetooth, Bluetooth low energy (BLE), and Zigbee.

The speaker 160 is a component that outputs various audio data on which various processing tasks such as decoding, amplification, and noise filtering have been performed by an audio processing unit. The speaker 160 may output various notification sounds or voice messages. According to an embodiment of the disclosure, the processor 140 may convert an electrical signal received from an external device into a user's voice and output the converted user's voice through the speaker 160.

The microphone 170 may receive acoustic signals around the electronic device 100. As an example, the microphone 170 may receive a user's voice controlling the electronic device 100. When the user's voice for executing a specific function is received through the microphone 170, the processor 140 may convert the user's voice into a digital signal through a speech to text (STT) algorithm and provide response information corresponding to the user's voice.

The input interface 180 is a configuration that allows the electronic device 100 to interact with a user. For example, the user interface may include at least one of a touch sensor, a motion sensor, a button, a jog dial, a switch, and the microphone 170, but is not limited thereto.

The sensor 190 may acquire information on the external environment or information on a user command. To this end, the sensor 190 may be implemented at least one of a gyro sensor, an infrared sensor, a ToF sensor, a LiDAR sensor, an acceleration sensor, a touch sensor and a motion sensor in the circuit form. In addition, the sensor 190 may further include at least one of a global positioning system (GPS) sensor and a geomagnetic sensor.

The methods according to various embodiments of the disclosure described above may be implemented in a form of application that may be installed in the existing electronic device. Alternatively, the above-described methods according to various embodiments of the disclosure may be performed using a deep learning-based artificial neural network (or deep artificial network), that is, a learning network model.

In addition, the methods according to various embodiments of the disclosure described above may be implemented only by software upgrade or hardware upgrade of the existing electronic device.

In addition, various embodiments of the disclosure described above can be performed through an embedded server provided in the electronic device or a server outside the electronic device.

According to an embodiment of the disclosure, various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic device (for example, the electronic device A) according to the disclosed embodiments. In the case in which a command is executed by the processor, the processor may directly perform a function corresponding to the command using other components directly or under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, according to an embodiment of the disclosure, the above-described methods according to the diverse embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, Play-Store™). In case of the online distribution, at least a portion of the computer program product may be at least temporarily stored in a storage medium such as a memory of a server of a manufacturer, a server of an application store, or a relay server or be temporarily generated.

In addition, each of components (for example, modules or programs) according to various embodiments described above may include a single entity or a plurality of entities, and some of the corresponding sub-components described above may be omitted or other sub-components may be further included in the diverse embodiments. Alternatively or additionally, some components (for example, a module or a program) may be integrated into a single entity to perform the same or similar functions performed by each corresponding components prior to the integration. Operations performed by the modules, the programs, or the other components according to various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
a camera;
at least one memory configured to store at least one instruction;
a display; and
at least one processor configured to execute the at least one instruction to:
acquire a label image of clothing through the camera,
based on identifying a plurality of clothing management symbols in the label image:
identify a misrecognized clothing management symbol among the plurality of clothing management symbols based on a standard type and a management type of each of the plurality of clothing management symbols,
correct the misrecognized clothing management symbol based on at least one of a standard type and a management type of a normally recognized symbol from among the plurality of clothing management symbols,
generate management information related to the clothing based on the corrected misrecognized clothing management symbol, and
control the display to display the generated management information.

2. The electronic device of claim 1, wherein the at least one memory stores a neural network model configured to recognize the plurality of clothing management symbols in the label image, and
wherein the at least one processor is further configured to execute the at least one instruction to identify the plurality of clothing management symbols included in the label image using the neural network model.

3. The electronic device of claim 1, wherein the at least one processor is further configured to execute the at least one instruction to:
identify candidate symbol information for each of the plurality of clothing management symbols and reliability for the identified candidate symbol information, and
identify the misrecognized clothing management symbol by comparing a standard type of the identified candidate symbol information having a highest reliability value with a standard type of another identified candidate symbol information.

4. The electronic device of claim 1, wherein the at least one processor is further configured to execute the at least one instruction to:
identify candidate symbol information for each of the plurality of clothing management symbols and reliability for the identified candidate symbol information,
identify, among the plurality of clothing management symbols, a plurality of first clothing management symbols corresponding to identified candidate symbol information with the same management type, and
identify as the misrecognized clothing management symbol, a first clothing management symbol corresponding to the identified candidate symbol information having a lowest reliability among the plurality of first clothing management symbols.

5. The electronic device of claim 4, wherein the at least one processor is further configured to execute the at least one instruction to:

identify a plurality of pieces of semantic information corresponding to each of the plurality of first clothing management symbols, and based on identifying that the plurality of pieces of semantic information do not match, identify, as the misrecognized clothing management symbol, the first clothing management symbol corresponding to the identified candidate symbol information having the lowest reliability among the plurality of first clothing management symbols.

6. The electronic device of claim 1, wherein the at least one processor is further configured to execute the at least one instruction to:

based on the plurality of clothing management symbols being arranged in a plurality of rows in the label image, repeat the operations of claim 1 on a row-by-row basis.

7. The electronic device of claim 1, wherein the at least one processor is further configured to execute the at least one instruction to:

based on identifying that the label image does not include clothing management symbols, identify a material of the clothing based on the label image, and generate the management information on the clothing based on the identified material.

8. The electronic device of claim 1, wherein the at least one memory stores a plurality of candidate symbol images corresponding to each of a plurality of candidate symbol information, and wherein the at least one processor is further configured to execute the at least one instruction to:

identify candidate symbol information for each of the plurality of-clothing management symbols and reliability for the identified candidate symbol information, based on the identified candidate symbol information having a highest reliability value having a clothing management symbol of a first type, identify the identified clothing management symbol corresponding to the identified candidate symbol information having the highest reliability value as an unrecognized symbol, acquire a clothing management symbol image corresponding to the unrecognized symbol based on the label image, and identify a standard type and a management type of the unrecognized symbol based on a similarity between the acquired clothing management symbol image and each of the plurality of candidate symbol images.

9. The electronic device of claim 1, wherein the at least one processor is further configured to execute the at least one instruction to:

based on identifying that the label image does not include a clothing management symbol associated with a first management type, acquire first management process information comprising management information corresponding to the first management type based on the generated management information, and generate management information corresponding to the first management type based on the acquired first management process information.

10. The electronic device of claim 1, further comprising: a communication interface configured to communicate with a clothing processing device, wherein the at least one processor is further configured to execute the at least one instruction to:

control the communication interface to transmit management information corresponding to a management type to the clothing processing device.

11. A method of controlling an electronic device, the method comprising:

acquiring a label image of clothing through a camera;

identifying a plurality of clothing management symbols in the label image;

identifying a misrecognized clothing management symbol among the plurality of clothing management symbols based on a standard type and a management type of each of the plurality of clothing management symbols;

correcting the misrecognized clothing management symbol based on at least one of a standard type and a management type of a normally recognized symbol from among the plurality of clothing management symbols;

generate management information related to the clothing based on the corrected misrecognized clothing management symbol; and displaying the generated management information on a display.

12. The method of claim 11, wherein the identifying the plurality of clothing management symbols comprises using a neural network model configured to recognize the plurality of clothing management symbols in the label image.

13. The method of claim 11, wherein the identifying the misrecognized clothing management symbol further comprises:

identifying candidate symbol information for each of the plurality of clothing management symbols and reliability for the identified candidate symbol information; and identifying the misrecognized clothing management symbol by comparing a standard type of the identified candidate symbol information having a highest reliability value with a standard type of another identified candidate symbol information.

14. The method of claim 11, wherein the identifying the misrecognized clothing management symbol further comprises:

identifying candidate symbol information for each of the plurality of clothing management symbols and reliability for the identified candidate symbol information;

identifying, among the plurality of clothing management symbols, a plurality of first clothing management symbols corresponding to identified candidate symbol information with the same management type; and identifying, as the misrecognized clothing management symbol, a first clothing management symbol corresponding to the identified candidate symbol information having a lowest reliability among the plurality of first clothing management symbols.

15. The method of claim 14, wherein the identifying the misrecognized clothing management symbol further comprises:

identifying a plurality of pieces of semantic information corresponding to each of the plurality of first clothing management symbols; and based on identifying that the plurality of pieces of identified semantic information do not match, identifying, as the misrecognized clothing management symbol, the first clothing management symbol corresponding to the identified candidate symbol information having the lowest reliability among the plurality of first clothing management symbols.

16. A non-transitory computer readable medium having instructions stored therein, which when executed by at least one processor cause the at least one processor to execute a method of controlling an electronic device, the method comprising:

acquiring a label image of clothing through a camera;

identifying a plurality of clothing management symbols in the label image;

identifying a misrecognized clothing management symbol among the plurality of clothing management symbols based on a standard type and a management type of each of the plurality of clothing management symbols;

correcting the misrecognized clothing management symbol based on at least one of a standard type and a management type of a normally recognized symbol from among the plurality of clothing management symbols;

generate management information related to the clothing based on the corrected misrecognized clothing management symbol; and displaying the generated management information on a display.

17. The non-transitory computer readable medium of claim 16, wherein the identifying the plurality of clothing management symbols comprises using a neural network model configured to recognize the plurality of clothing management symbols in the label image.

18. The non-transitory computer readable medium of claim 16, wherein the identifying the misrecognized clothing management symbol further comprises:

identifying candidate symbol information for each of the plurality of clothing management symbols and reliability for the identified candidate symbol information; and identifying the misrecognized clothing management symbol by comparing a standard type of the identified candidate symbol information having a highest reliability value with a standard type of another identified candidate symbol information.

19. The non-transitory computer readable medium of claim 16, wherein the identifying the misrecognized clothing management symbol further comprises:

identifying candidate symbol information for each of the plurality of clothing management symbols and reliability for the identified candidate symbol information;

identifying, among the plurality of clothing management symbols, a plurality of first clothing management symbols corresponding to identified candidate symbol information with the same management type; and identifying, as the misrecognized clothing management symbol, a first clothing management symbol corresponding to the identified candidate symbol information having a lowest reliability among the plurality of first clothing management symbols.

20. The non-transitory computer readable medium of claim 19, wherein the identifying the misrecognized clothing management symbol further comprises:

identifying a plurality of pieces of semantic information corresponding to each of the plurality of first clothing management symbols; and based on identifying that the plurality of pieces of identified semantic information do not match, identifying, as the misrecognized clothing management symbol, the first clothing management symbol corresponding to the identified candidate symbol information having the lowest reliability among the plurality of first clothing management symbols.

* * * * *